United States Patent
Hatakeyama et al.

(10) Patent No.: US 10,827,141 B2
(45) Date of Patent: Nov. 3, 2020

(54) IMAGE PICKUP DEVICE AND AND IMAGE PICKUP METHOD HAVING CAPABILITY OF ADDING ADDITIONAL INFORMATION INDICATING THE CHARACTERISTIC OF A PIXEL DATA SEQUENCE TO THE PIXEL DATA SEQUENCE

(71) Applicant: Olympus Corporation, Hachioji-shi, Tokyo (JP)

(72) Inventors: Ryo Hatakeyama, Hino (JP); Kazuhiro Haneda, Hachioji (JP)

(73) Assignee: Olympus Corporation, Tokyo (JP)

( * ) Notice: Subject to any disclaimer, the term of this patent is extended or adjusted under 35 U.S.C. 154(b) by 31 days.

(21) Appl. No.: 16/027,218

(22) Filed: Jul. 3, 2018

(65) Prior Publication Data

US 2019/0020838 A1 Jan. 17, 2019

(30) Foreign Application Priority Data

Jul. 12, 2017 (JP) .................. 2017-136419

(51) Int. Cl.
*H04N 5/369* (2011.01)
*H04N 5/225* (2006.01)
*H04N 5/232* (2006.01)
*H04N 5/378* (2011.01)
(Continued)

(52) U.S. Cl.
CPC ......... *H04N 5/3698* (2013.01); *H04N 5/2254* (2013.01); *H04N 5/23212* (2013.01); *H04N 5/232122* (2018.08); *H04N 5/232411* (2018.08); *H04N 5/3696* (2013.01);
(Continued)

(58) Field of Classification Search
CPC .. H04N 5/3698; H04N 5/2254; H04N 5/3696; H04N 5/23212; H04N 5/36961; H04N 5/232411; H04N 5/37457; H04N 5/378; H04N 5/232122; H04N 9/04557
See application file for complete search history.

(56) References Cited

U.S. PATENT DOCUMENTS

| | | | | |
|---|---|---|---|---|
| 4,410,804 A | * | 10/1983 | Stauffer | G06K 9/00201 250/208.2 |
| 2004/0252217 A1 | * | 12/2004 | Battles | H04N 5/232 348/333.01 |

(Continued)

FOREIGN PATENT DOCUMENTS

| | | |
|---|---|---|
| CN | 104429056 A | 3/2015 |
| CN | 105376476 A | 3/2016 |

OTHER PUBLICATIONS

Office Action to corresponding Chinese Patent Application No. 201810535835.5, dated Apr. 9, 2020 (9 pgs.).

*Primary Examiner* — Luong T Nguyen
(74) *Attorney, Agent, or Firm* — John C. Pokotylo; Pokotylo Patent Services

(57) ABSTRACT

An image pickup device, in which a plurality of pixels photoelectrically convert incident light and generate a plurality of pieces of pixel data, includes a vertical scanning section configured to generate a pixel data sequence composed of pixel data having a same characteristic, a pixel section, an analog processing section, an ADC processing section, a memory section, a horizontal scanning section, and an output section configured to add additional information indicating the characteristic of the pixel data sequence to the pixel data sequence.

20 Claims, 16 Drawing Sheets

(51) Int. Cl.
*H04N 9/04* (2006.01)
*H04N 5/3745* (2011.01)

(52) U.S. Cl.
CPC ......... *H04N 5/36961* (2018.08); *H04N 5/378* (2013.01); *H04N 5/37457* (2013.01); *H04N 9/04557* (2018.08)

(56) References Cited

U.S. PATENT DOCUMENTS

| | | | | |
|---|---|---|---|---|
| 2011/0317027 | A1* | 12/2011 | Shinmei | H04N 5/2355 348/223.1 |
| 2012/0120289 | A1* | 5/2012 | Sugioka | G06T 1/0007 348/294 |
| 2015/0264333 | A1* | 9/2015 | Ishiga | H04N 5/2254 382/154 |
| 2016/0044238 | A1* | 2/2016 | Takada | H04N 5/23241 348/222.1 |

* cited by examiner

FIG. 7

|    | 1  | 2  | 3  | 4  | 5  | 6  | 7  | 8  | 9  | 10 | 11 | 12 | 13 | 14 | 15 | 16 | ···m |
|----|----|----|----|----|----|----|----|----|----|----|----|----|----|----|----|----|---|
| 1  | Gr | Gr | R  | R  | Gr | Gr | R  | R  | Gr | Gr | R  | R  | Gr | Gr | R  | R  | |
| 2  | Gr | Gr | R  | R  | Gr | Gr | R  | R  | Gr | Gr | R  | R  | Gr | Gr | R  | R  | |
| 3  | B  | B  | Gb | Gb | B  | B  | Gb | Gb | B  | B  | Gb | Gb | B  | B  | Gb | Gb | |
| 4  | B  | B  | Gb | Gb | B  | B  | Gb | Gb | B  | B  | Gb | Gb | B  | B  | Gb | Gb | |
| 5  | Gr | Gr | R  | R  | Gr | Gr | R  | R  | Gr | Gr | R  | R  | Gr | Gr | R  | R  | |
| 6  | Gr | Gr | R  | R  | Gr | Gr | R  | R  | Gr | Gr | R  | R  | Gr | Gr | R  | R  | |
| 7  | B  | B  | Gb | Gb | B  | B  | Gb | Gb | B  | B  | Gb | Gb | B  | B  | Gb | Gb | |
| 8  | B  | B  | Gb | Gb | B  | B  | Gb | Gb | B  | B  | Gb | Gb | B  | B  | Gb | Gb | |
| 9  | Gr | Gr | R  | R  | Gr | Gr | R  | R  | Gr | Gr | R  | R  | Gr | Gr | R  | R  | |
| 10 | Gr | Gr | R  | R  | Gr | Gr | R  | R  | Gr | Gr | R  | R  | Gr | Gr | R  | R  | |
| 11 | B  | B  | Gb | Gb | B  | B  | Gb | Gb | B  | B  | Gb | Gb | B  | B  | Gb | Gb | |
| 12 | B  | B  | Gb | Gb | B  | B  | Gb | Gb | B  | B  | Gb | Gb | B  | B  | Gb | Gb | |

|   | 1  | 2  | 3  | 4  | 5  | 6  | 7  | 8  |
|---|----|----|----|----|----|----|----|----|
| 1 | Gr | R  | Gr | R  | Gr | R  | Gr | R  |
| 2 | B  | Gb | B  | Gb | B  | Gb | B  | Gb |
| 3 | Gr | R  | Gr | R  | Gr | R  | Gr | R  |
| 4 | B  | Gb | B  | Gb | B  | Gb | B  | Gb |
| 5 | Gr | R  | Gr | R  | Gr | R  | Gr | R  |
| 6 | B  | Gb | B  | Gb | B  | Gb | B  | Gb |

FIG. 9

|   | 1  | 2  | 3  | 4  | 5  | 6  | 7  | 8  | 9  | 10 | 11 | 12 | 13 | 14 | 15 | 16 |
|---|----|----|----|----|----|----|----|----|----|----|----|----|----|----|----|----|
| 1 | Gr | Gr | R  | R  | Gr | Gr | R  | R  | Gr | Gr | R  | R  | Gr | Gr | R  | R  |
| 2 | B  | B  | Gb | Gb | B  | B  | Gb | Gb | B  | B  | Gb | Gb | B  | B  | Gb | Gb |
| 3 | Gr | Gr | R  | R  | Gr | Gr | R  | R  | Gr | Gr | R  | R  | Gr | Gr | R  | R  |
| 4 | B  | B  | Gb | Gb | B  | B  | Gb | Gb | B  | B  | Gb | Gb | B  | B  | Gb | Gb |
| 5 | Gr | Gr | R  | R  | Gr | Gr | R  | R  | Gr | Gr | R  | R  | Gr | Gr | R  | R  |
| 6 | B  | B  | Gb | Gb | B  | B  | Gb | Gb | B  | B  | Gb | Gb | B  | B  | Gb | Gb |

FIG. 10

|   | 1  | 2  | 3  | 4  | 5  | 6  | 7  | 8  |
|---|----|----|----|----|----|----|----|----|
| 1 | Gr | R  | Gr | R  | Gr | R  | Gr | R  |
| 2 | Gr | R  | Gr | R  | Gr | R  | Gr | R  |
| 3 | B  | Gb | B  | Gb | B  | Gb | B  | Gb |
| 4 | B  | Gb | B  | Gb | B  | Gb | B  | Gb |
| 5 | Gr | R  | Gr | R  | Gr | R  | Gr | R  |
| 6 | Gr | R  | Gr | R  | Gr | R  | Gr | R  |
| 7 | B  | Gb | B  | Gb | B  | Gb | B  | Gb |
| 8 | B  | Gb | B  | Gb | B  | Gb | B  | Gb |
| 9 | Gr | R  | Gr | R  | Gr | R  | Gr | R  |
| 10| Gr | R  | Gr | R  | Gr | R  | Gr | R  |
| 11| B  | Gb | B  | Gb | B  | Gb | B  | Gb |
| 12| B  | Gb | B  | Gb | B  | Gb | B  | Gb |

FIG. 11

|   | 1  | 2  | 3  | 4  |
|---|----|----|----|----|
| 1 | Gr | R  | Gr | R  |
| 2 | B  | Gb | B  | Gb |

|   | 1  | 2  |
|---|----|----|
| 1 | Gr | R  |
| 2 | B  | Gb |

FIG. 18

| BIT | FLAG TYPE | (1) | (2) | (3) |
|---|---|---|---|---|
| 0 | IMAGE PIXEL FLAG | 1 | 0 | 1 |
| 1 | FOCUS DETECTION PIXEL FLAG | 0 | 0 | 1 |
| 2 | IMAGE SYNTHESIS PROCESSING FLAG | 0 | 0 | 1 |
| 3 | FOCUS DETECTION SUBTRACTION PROCESSING FLAG | 0 | 0 | 0 |

IMAGE PICKUP DEVICE AND AND IMAGE PICKUP METHOD HAVING CAPABILITY OF ADDING ADDITIONAL INFORMATION INDICATING THE CHARACTERISTIC OF A PIXEL DATA SEQUENCE TO THE PIXEL DATA SEQUENCE

CROSS REFERENCE TO RELATED APPLICATION

This application claims benefit of Japanese Application No. 2017-136419 filed in Japan on Jul. 12, 2017, the entire contents of which are incorporated herein by this reference.

BACKGROUND OF THE INVENTION

1. Field of the Invention

The present invention relates to an image pickup device, an image pickup apparatus, a recording medium and an image pickup method configured to array a plurality of pieces of pixel data generated by a plurality of pixels photoelectrically converting incident light and generate a pixel data sequence.

2. Description of the Related Art

In recent years, output interfaces for image pickup devices are implemented so as to operate faster and faster. Such image pickup devices seek to reduce power consumption by restricting the output interface in a photographing mode not requiring a maximum data transfer rate such as a live view (LV) mode in which pixel decimation or mixing (MIX) processing is performed, compared to a photographing mode requiring a maximum data transfer rate such as a still image mode.

To be more specific, when the number of lanes used to transmit pixel data is, for example, 4, pixel data is transmitted using all the four lanes in the still image mode, whereas in the LV mode, the number of lanes used is limited to 2 and pixel data is transmitted using only two authorized lanes.

SUMMARY OF THE INVENTION

An image pickup device according to an aspect of the present invention is an image pickup device including a plurality of pixels, the plurality of pixels being configured to photoelectrically convert incident light and generate a plurality of pieces of pixel data, the image pickup device including a pixel data sequence generation section configured to array the plurality of pieces of pixel data according to a characteristic of the pixel data and generate a pixel data sequence composed of the pixel data having the same characteristic, and an information adding section configured to add additional information indicating the characteristic of the pixel data sequence to the pixel data sequence.

An image pickup apparatus according to another aspect of the present invention includes the image pickup device, a data processing section configured to receive the pixel data outputted from the image pickup device as required and process the pixel data when the pixel data is inputted and a control section configured to perform control so as to determine, based on the additional information, whether or not valid pixel data is inputted to the data processing section, supply power and a clock to the data processing section when the control section determines that the valid pixel data is inputted to the data processing section, or stop at least a clock supply to the data processing section when the control section determines that the valid pixel data is not inputted to the data processing section.

A recording medium according to a further aspect of the present invention is a computer-readable non-transitory recording medium configured to record an image pickup program for causing a computer to execute an image pickup step of photoelectrically converting incident light and generating a plurality of pieces of pixel data by a plurality of pixels, a pixel data sequence generation step of arraying the plurality of pieces of pixel data according to a characteristic of the pixel data and generating a pixel data sequence composed of the pixel data having a same characteristic, an information adding step of adding additional information indicating the characteristic of the pixel data sequence to the pixel data sequence, a data processing step of inputting the pixel data outputted from an image pickup device to a data processing section as required and processing the pixel data by the data processing section when the pixel data is inputted, and a control step of performing control so as to determine, based on the additional information, whether or not valid pixel data is inputted to the data processing section, supply power and a clock to the data processing section when determining that the valid pixel data is inputted to the data processing section, or stop at least a clock supply to the data processing section when determining that the valid pixel data is not inputted to the data processing section.

An image pickup method according to a still further aspect of the present invention includes an image pickup step of photoelectrically converting incident light and generating a plurality of pieces of pixel data by a plurality of pixels, a pixel data sequence generation step of arraying the plurality of pieces of pixel data according to a characteristic of the pixel data and generating a pixel data sequence composed of the pixel data having a same characteristic, an information adding step of adding additional information indicating the characteristic of the pixel data sequence to the pixel data sequence, a data processing step of inputting the pixel data outputted from an image pickup device to a data processing section as required and processing the pixel data by the data processing section when the pixel data is inputted, and a control step of performing control by determining, based on the additional information, whether or not valid pixel data is inputted to the data processing section so as to supply power and a clock to the data processing section when determining that the valid pixel data is inputted to the data processing section, or stop at least a clock supply to the data processing section when determining that the valid pixel data is not inputted to the data processing section.

BRIEF DESCRIPTION OF THE DRAWINGS

FIG. 7 is a diagram illustrating an arrangement of focus detection pixel data P0 obtained by reading all pixels from the image pickup device having the 4PD pixel structure according to Embodiment 1 of the present invention;

FIG. 8 is a diagram illustrating an arrangement of image pixel data P1 read from the image pickup device having the 4PD pixel structure according to Embodiment 1 of the present invention by performing pixel addition;

FIG. 9 is a diagram illustrating an arrangement of focus detection pixel data P2 for performing phase difference detection in a horizontal direction read from the image pickup device having the 4PD pixel structure according to Embodiment 1 of the present invention by performing pixel addition;

FIG. 10 is a diagram illustrating an arrangement of focus detection pixel data P3 for performing phase difference detection in a vertical direction read from the image pickup device having the 4PD pixel structure according to Embodiment 1 of the present invention by performing pixel addition;

FIG. 11 is a diagram illustrating an arrangement of V2/2H2/2 mixed reading pixel data P4 read from the image pickup device according to Embodiment 1 of the present invention by performing addition averaging;

FIG. 18 is a diagram illustrating specific examples of flags included in the additional information in FIG. 17 according to Embodiment 1 of the present invention;

DETAILED DESCRIPTION OF THE PREFERRED EMBODIMENTS

Hereinafter, embodiments of the present invention will be described with reference to the accompanying drawings.

Embodiment 1

Figure 1:
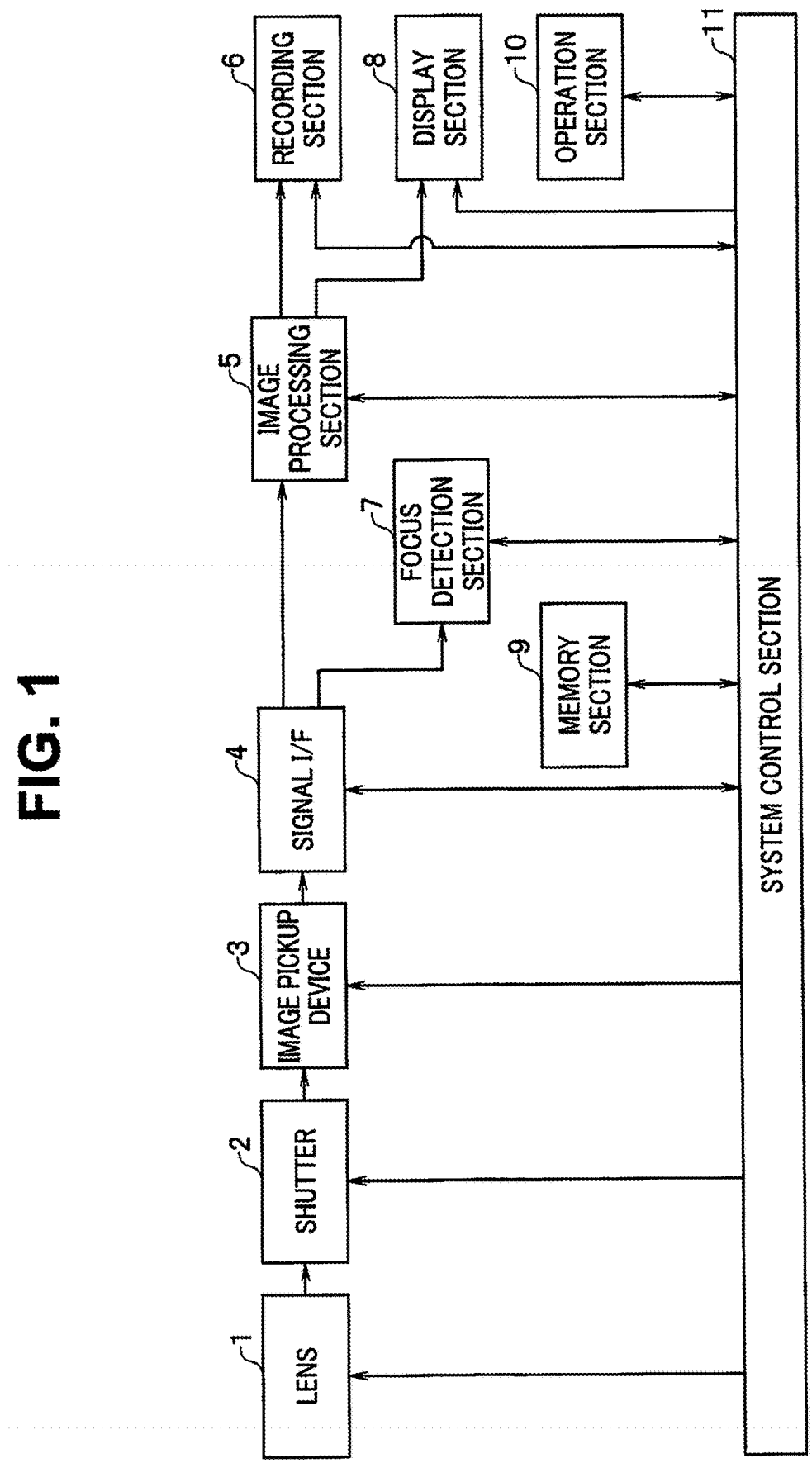
FIG. 1 is a block diagram illustrating a configuration of an image pickup apparatus according to Embodiment 1 of the present invention.

FIG. 1 to FIG. 21 illustrate Embodiment 1 of the present invention and FIG. 1 is a block diagram illustrating a configuration of an image pickup apparatus.

As shown in FIG. 1, the image pickup apparatus is provided with a lens 1, a shutter 2, an image pickup device 3, a signal interface (signal I/F) 4, an image processing section 5, a recording section 6, a focus detection section 7, a display section 8, a memory section 9, an operation section 10 and a system control section 11.

The lens 1 is a photographing optical system for forming an optical image of an object on the image pickup device 3. The lens 1 is provided with a focus lens for adjusting a focus position and an optical aperture for controlling a range of luminous flux passing through the lens 1 and is configured as a zoom lens that makes focal length changeable, for example.

The focus position of the lens 1, an opening diameter (aperture value) of the optical aperture and the focal length can be changed through drive control of the lens 1 by the system control section 11 which will be described later.

The shutter 2 is intended to control the time for luminous flux from the lens 1 to arrive at the image pickup device 3 and is, for example, a mechanical shutter configured to run a shutter curtain such as a focal plane shutter.

The image pickup device 3 includes a plurality of pixels and is an image pickup section in which the plurality of pixels photoelectrically convert incident light and generate a plurality of pieces of pixel data. To be more specific, the image pickup device 3 includes an image pickup surface on which a plurality of pixels are two-dimensionally arrayed at a predetermined pixel pitch and is configured to photoelectrically convert the optical image of the object formed by the lens 1 through the shutter 2 and generate pixel data based on the control by the system control section 11 which is the image pickup control section.

The image pickup device 3 is configured as a single plate CMOS image pickup device provided with, for example, a color filter with a primary color Bayer array. As is publicly known, the primary color Bayer array uses 2×2 pixels as a basic color array, disposes G (green color) filters at diagonal positions of the basic color array and disposes R (red color) filters and B (blue color) filters at the remaining diagonal positions respectively. Note that a G pixel provided with a G filter disposed on the same row as an R pixel provided with an R filter is called a "Gr pixel" and a G pixel provided with a G filter disposed on the same row as a B pixel provided with a B filter is called a "Gb pixel."

The image pickup device 3 is configured such that one pixel is divided into a plurality of portions so as to be able to output focus detection pixel data, and a more specific configuration will be described with reference to FIG. 2 and subsequent figures.

The signal I/F 4 is configured to output pixel data outputted from the image pickup device 3 (including image pixel data and focus detection pixel data as will be described later) by sorting the pixel data to the image processing section 5 and the focus detection section 7 according to the characteristic of the pixel data. To be more specific, the signal I/F 4 is configured to output the pixel data to only the image processing section 5 when the pixel data is image pixel data or output the pixel data to the image processing section 5 and the focus detection section 7 when the pixel data is focus detection pixel data. However, when the focus detection pixel data is not used to generate images, the focus detection pixel data may be outputted to only the focus detection section 7. Furthermore, the signal I/F 4 is configured to extract additional information indicating a characteristic of the pixel data which is added to the pixel data sequence outputted from the image pickup device 3 (see FIG. 14 to FIG. 18, or the like which will be described later) and transmit the additional information to the system control section 11.

The image processing section 5 is a data processing section configured to perform image processing on the pixel data and generate images (image to be displayed on the display section 8 or image to be recorded in the recording section 6).

For example, when the pixel data received from the signal I/F 4 is focus detection pixel data, the image processing section 5 performs processing of generating image pixel data from the focus detection pixel data.

The image processing section 5 performs image processing such as OB subtraction, white balance (WB) gain, demosaicking, noise reduction, color conversion, gamma conversion, zooming in and out (including a so-called developing process) on the image pixel data. Note that data compression/data decompression when recording or reading a still image or movie in/from the recording section 6 may be performed by the image processing section 5 or by providing a dedicated compression/decompression section.

The recording section 6 is a recording section configured to store image data composed of a plurality of pieces of pixel data (still image data, movie data or the like) in a non-volatile manner and is composed of, for example, a flash memory incorporated in the image pickup apparatus body or a memory card attachable/detachable to/from the image pickup apparatus body. Therefore, the recording section 6 is not limited to a configuration specific to the image pickup apparatus.

Figure 3:
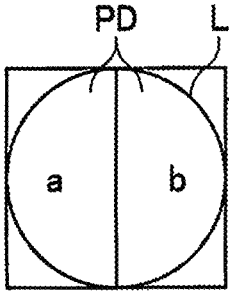
FIG. 3 is a diagram illustrating an example of a pixel structure in which two or four photodiodes are arranged on one micro lens according to Embodiment 1 of the present invention.

The focus detection section 7 is a data processing section configured to perform focus detection based on focus detection pixel data obtained by pixels having different positions relative to a micro lens L (see FIG. 3). That is, the focus detection section 7 is configured to perform image surface phase difference detection based on focus detection pixel data received from the signal I/F 4, detect phase difference information of the object image and calculate lens control parameters to move the focus position of the lens 1 to a focusing position.

The image processing section 5 and the focus detection section 7 constitute a data processing section configured to receive pixel data outputted from the image pickup device 3 and sorted by the signal I/F 4 as required and process the pixel data when received.

The display section 8 is a display apparatus configured to display not only images but also various types of information associated with the image pickup apparatus. The display section 8 includes a device such as an LCD panel or an organic electroluminescence (organic EL) display. Examples of specific arrangement and configuration of the display section 8 include an electronic view finder (EVF), a back panel of the image pickup apparatus, a display apparatus of a portable device wirelessly connected to the image pickup apparatus. Therefore, the display section 8 is not limited to being a configuration specific to the image pickup apparatus.

The memory section 9 is a storage section configured to temporarily store pixel data generated by the image pickup device 3 and is constructed of, for example, a DRAM (dynamic random access memory). The memory section 9 is also used as a work memory or a buffer memory of images for when the image processing section 5 performs image processing or when the focus detection section 7 performs phase difference detection.

The operation section 10 is intended to perform various types of operation input to the image pickup apparatus. The operation section 10 includes operation buttons such as a power button for turning ON/OFF the power of the image pickup apparatus, a release button for instructing to start photographing an image, a play button for playing back a recorded image, a menu button for setting the image pickup apparatus, a cross key used to select an item, an OK button used to confirm a selected item.

Examples of items that can be set using the menu button, the cross key, the OK button or the like include a photographing mode (still image photographing mode, movie shooting mode or the like), a recording mode (JPEG recording, RAW+JPEG recording or the like) and a playback mode. When operation on the operation section 10 is performed, a signal corresponding to the operation contents is outputted to the system control section 11.

Note that examples of a specific arrangement and configuration of the operation section 10 include buttons and switches provided on a package of the camera body or a touch panel provided on the display surface of the back panel of the display section 8, a remote release apparatus for a remote operation and a portable device. Therefore, the operation section 10 is not limited to being a configuration specific to the image pickup apparatus, either.

The system control section 11 includes, for example, a CPU and is a control section configured to totally control the respective sections in the image pickup apparatus.

The system control section 11 executes various types of sequences in accordance with operation inputs from the operation section 10 according to a predetermined processing program (including an image pickup program). The processing program may be stored in the system control section 11 in a non-volatile manner or may be read by the system control section 11 stored in the memory section 9 in a non-volatile manner.

For example, the system control section 11 is configured to control the focus lens of the lens 1 based on the lens control parameters calculated by the focus detection section 7, control the aperture of the lens 1 and the shutter 2 based on the result of exposure calculation performed in the system control section 11, and control the image pickup device 3 to pick up an image and output pixel data.

Furthermore, the system control section 11 is configured to perform control so as to change processes by the image processing section 5 and the focus detection section 7 based on the additional information acquired from the signal I/F 4.

Furthermore, the system control section 11 is configured to perform control so as to display various types of information on the display section 8 and also control so as to record or read data in/from the recording section 6.

Figure 2:
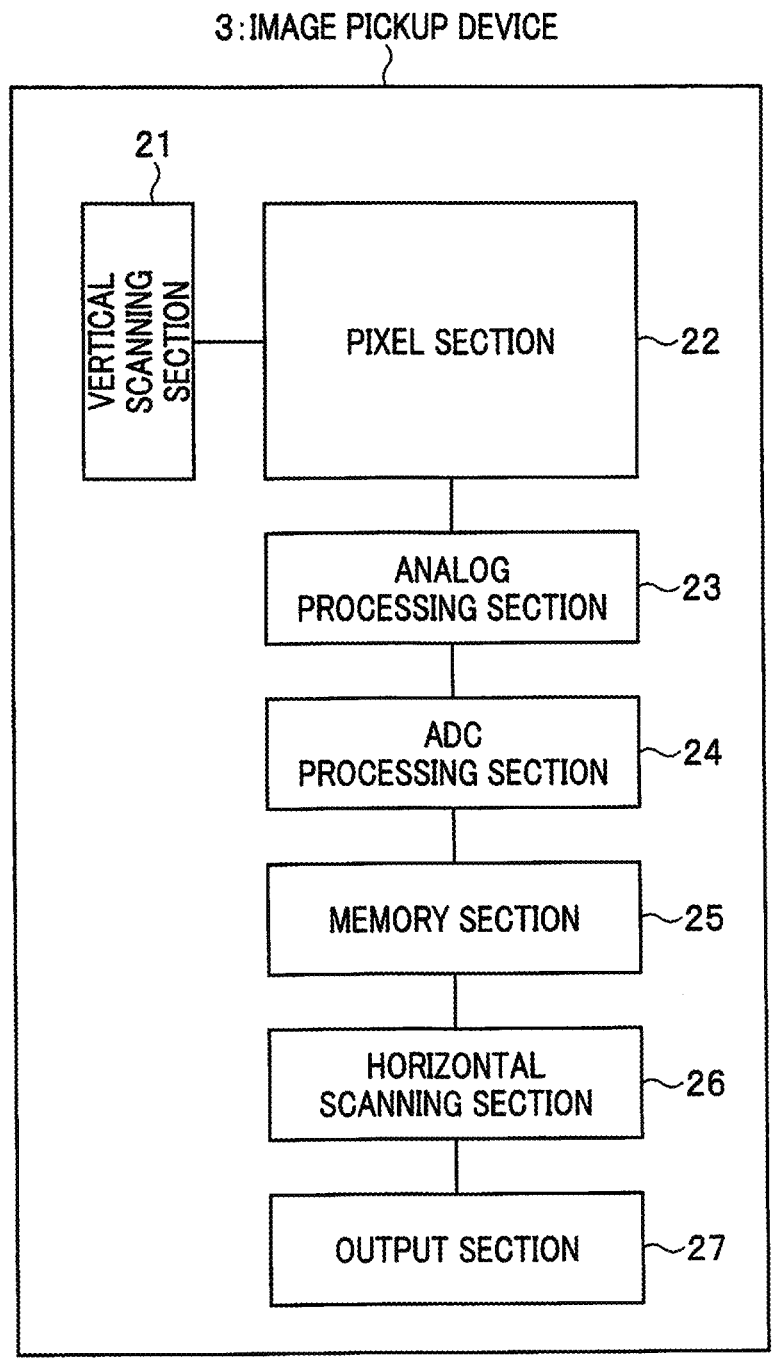
FIG. 2 is a block diagram illustrating a configuration of an image pickup device according to Embodiment 1 of the present invention.

Next, FIG. 2 is a block diagram illustrating a configuration of the image pickup device 3.

The image pickup device 3 is provided with a vertical scanning section 21, a pixel section 22, an analog processing section 23, an ADC processing section 24, a memory section 25, a horizontal scanning section 26 and an output section 27.

Among these sections, the vertical scanning section 21, the pixel section 22, the memory section 25 and the horizontal scanning section 26 function as in-device processing sections operating individually or in cooperation and are designed to be able to perform addition calculation or addition averaging calculation on a plurality of pieces of pixel data or the like.

The processes performed by the in-device processing sections include a process of pixel-synthesizing one pixel data from a plurality of pieces of pixel data within a predetermined number of pieces of pixel data generated from a predetermined number of pixels corresponding to one micro lens L (for example, see FIG. 8 to FIG. 10).

By the in-device processing sections of the image pickup device 3 performing pixel addition or the like, the number of pixels outputted from the image pickup device 3 is reduced and it is thereby possible to alleviate a communication load and further alleviate processing loads on the image processing section 5 and the focus detection section 7.

The pixel section 22 is a pixel array section in which pixels for photoelectrically converting incident light and generating pixel data are two-dimensionally (e.g., vertical direction (the column direction) and the horizontal direction (row direction)) arrayed and the pixels include focus detection pixels for image surface phase difference detection.

Here, FIG. 3 is a diagram illustrating an example of a pixel structure in which two or four photodiodes PD are arranged on one micro lens L.

FIG. 3 illustrates a 2PD pixel structure in which two photodiodes PD are arranged for one micro lens L and a 4PD pixel structure in which four photodiodes PD are arranged for one micro lens L.

A pixel has a configuration in which the micro lens L, a color filter F and a photodiode PD are arranged in order in the lamination direction from the object side toward the image side. When the color filter F is, for example, a color filter in a primary color Bayer array, any one of an R filter, a G filter and a B filter is arranged in accordance with the pixel position.

In the case of the 2PD pixel structure shown in FIG. 3, two photodiodes PD are arranged within an image forming range of one micro lens L. The two photodiodes PD are divided into two left and right portions when they are intended to detect a phase difference in the horizontal direction or divided into two top and bottom portions when they are intended to detect a phase difference in the vertical direction. Two pixels "a" and "b" are formed in this way.

On the other hand, in the case of the 4PD pixel structure shown in FIG. 3, four photodiodes PD are arranged within an image forming range of one micro lens L. The four photodiodes PD are divided into four top, bottom, left and right portions so as to be able to detect a phase difference in the horizontal and vertical directions (that is, the four photodiodes PD are arranged at top left, bottom left, top right and bottom right positions). Four pixels "a," "b," "c" and "d" are formed in this way.

In this way, the image pickup device 3 is provided with a plurality of micro lenses L configured such that incident light passing through one micro lens L arrives at a predetermined plural number of pixels.

Note that a pixel structure including photodiodes PD divided into a predetermined plural number of portions for one micro lens L has been adopted here, but the structure is not limited to this. A configuration may be adopted in which although one photodiode PD may be disposed for one micro lens L, a light-shielding section for light-shielding part of a pupil may be provided on an optical path of light reaching the photodiode PD.

A case will be described hereinafter as an example where all pixels of the pixel section 22 have a 4PD pixel structure. In the case of the 4PD pixel structure, pixel data outputted from each photodiode PD is focus detection pixel data. Furthermore, the output of the photodiode PD is subjected to vertical 2-pixel addition, that is, when (a+b) and (c+d) in FIG. 3 are calculated, the pixel data becomes focus detection pixel data for detecting a phase difference in the horizontal direction. When the output of the photodiode PD is subjected to horizontal 2-pixel addition, that is, when (a+c) and (b+d) in FIG. 3 are calculated, the pixel data becomes focus detection pixel data for detecting a phase difference in the vertical direction. Furthermore, when the output of the photodiode PD is subjected to 4-pixel addition, that is, when (a+b+c+d) in FIG. 3 is calculated, the pixel data becomes image pixel data not including phase difference information.

The vertical scanning section 21 is a circuit configured to perform scanning in the vertical direction by sequentially selecting the horizontal direction (row) of the pixel section 22 which is a pixel array section. The vertical scanning section 21 selects a specific row and resets or transfers each pixel located on the selected row, and can thereby control accumulation time periods of pixels.

The analog processing section 23 is a circuit configured to apply analog signal processing to analog pixel data read from the pixel section 22. The analog processing section 23 includes, for example, a pre-amplifier configured to amplify pixel data, a correlation double sampling (CDS) circuit configured to reduce reset noise from the pixel data or the like.

The analog digital conversion processing section (ADC processing section) 24 is configured to convert the analog image signal outputted from the analog processing section 23 to a digital image signal. For the ADC processing section 24, a configuration is adopted in which pixel data read from the pixel section 22 represented by a column ADC is AD-converted by an analog-digital converter (ADC) for each column.

The memory section 25 is constructed of a volatile memory circuit or the like configured to temporarily store pixel data converted by the ADC processing section 24.

The horizontal scanning section 26 is configured to read pixel data (image pixel data and focus detection pixel data) from the memory section 25 in column order.

The output section 27 is configured to array pixel data read by the horizontal scanning section 26, generate a pixel data sequence, and convert the pixel data sequence into an output signal format such as a serial signal or a differential signal.

The aforementioned vertical scanning section 21 to output section 27 (the vertical scanning section 21, the pixel section 22, the analog processing section 23, the ADC processing section 24, the memory section 25, the horizontal scanning section 26 and the output section 27) constitute a pixel data sequence generation section configured to array a plurality of pieces of pixel data and generate a pixel data sequence composed of pixel data having the same characteristic in accordance with the characteristic of pixel data (a characteristic as to whether the pixel data is used for images or for focus detection, or a characteristic as to the direction of phase difference detection the focus detection pixel data is used for, further or a characteristic as to at what pixel mixing (pixel synthesis) the pixel data is generated).

For example, the vertical scanning section 21 to the output section 27 are configured to array a plurality of pieces of image pixel data and generate a certain pixel data sequence or array a plurality of pieces of focus detection pixel data and generate another pixel data sequence (therefore, the image pixel data sequence and the focus detection pixel data sequence are outputted separately from each other).

Furthermore, the output section 27 is intended to function as an information adding section configured to add additional information indicating a characteristic of the pixel data sequence to (part of) the pixel data sequence generated by the pixel data sequence generation section. At this time, it is a time point at which additional information is detected or later that it is possible to control the image processing section 5 and the focus detection section 7 to reduce power consumption, and so the position at which the additional information is added is preferably the head of the pixel data sequence.

Figure 4:
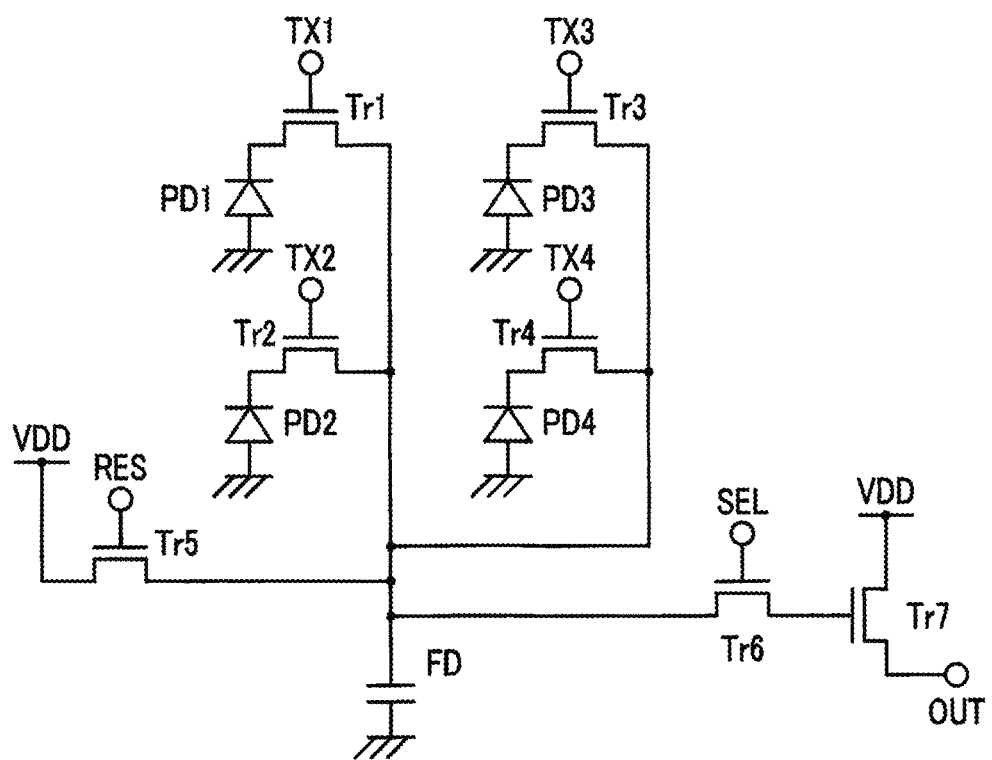
FIG. 4 is a circuit diagram illustrating a configuration example of pixels of a 4PD pixel structure according to Embodiment 1 of the present invention.

Next, FIG. 4 is a circuit diagram illustrating a configuration example of pixels of a 4PD pixel structure.

For pixels of the 4PD pixel structure, four photodiode PD1 to PD4 are arranged at positions corresponding to one micro lens L, and more specifically, the four PD1 to PD4 are arranged at four top left, bottom left, top right and bottom right positions within a range in which an optical image of the micro lens L is formed.

Transistors Tr1 to Tr4 functioning as switches are connected to the four photodiodes PD1 to PD4 respectively and ON/OFF of the transistors Tr1 to Tr4 is controlled by applying control signals TX1 to TX4 from the vertical scanning section 21.

Each transistor Tr1 to Tr4 is connected to a floating diffusion FD and signal charge of a photodiode PD corresponding to a turned ON transistor Tr is transferred to the floating diffusion FD.

Furthermore, a transistor Tr5 functioning as a switch is connected between each transistor Tr1 to Tr4 and the floating diffusion FD and ON/OFF of the transistor Tr5 is controlled by application of a reset signal RES. The transistor Tr5 is connected to a supply voltage VDD and by turning ON the transistor Tr5, the floating diffusion FD is reset. Furthermore, by turning ON the transistors Tr1 to Tr4 and further by turning ON the transistor Tr5, the photodiodes PD1 to PD4 are reset.

The floating diffusion FD is connected to an output terminal OUT via a transistor Tr6 functioning as a switch and a transistor Tr7 connected to a supply voltage VDD and functioning as an amplification section.

By applying a selection signal SEL to the transistor Tr6, the voltage value of the floating diffusion FD is amplified by the transistor Tr7 and is read from the output terminal OUT.

Figure 5:
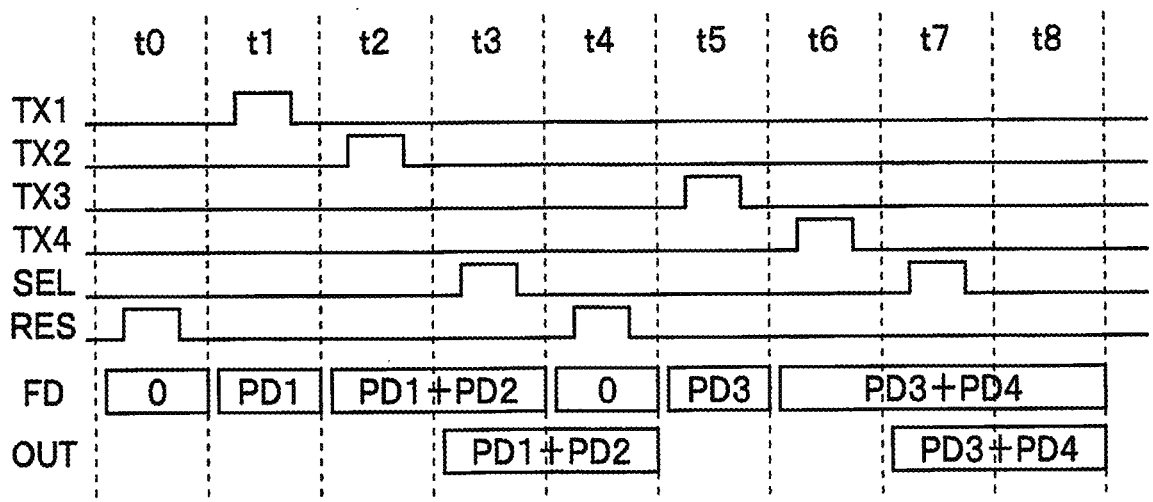
FIG. 5 is a timing chart illustrating an example of driving the image pickup device when pixels having a 4PD pixel structure according to Embodiment 1 of the present invention perform vertical 2-pixel addition.

FIG. 5 is a timing chart illustrating an example of driving the image pickup device 3 when pixels having a 4PD pixel structure perform vertical 2-pixel addition.

At timing t0, when the reset signal RES is turned ON (transistors other than the transistors Tr1 to Tr6 functioning as switches which are manifested to be ON are assumed to be OFF; and the same will apply hereinafter), the floating diffusion FD is reset.

At next timing t1, when the control signal TX1 is turned ON, the signal charge of the photodiode PD1 is transferred to the floating diffusion FD.

At next timing t2, when the control signal TX2 is turned ON, the signal charge of the photodiode PD2 is transferred to the floating diffusion FD, and the signal charge of the PD1 and the signal charge of the PD2 are accumulated in the floating diffusion FD.

At next timing t3, when the selection signal SEL is turned ON, a voltage of signal charge (PD1+PD2) accumulated in the floating diffusion FD is amplified by the transistor Tr7 and read from the output terminal OUT.

At next timing t4, when the reset signal RES is turned ON, the floating diffusion FD is reset.

At next timing t5, when the control signal TX3 is turned ON, the signal charge of the photodiode PD3 is transferred to the floating diffusion FD.

At next timing t6, when the control signal TX4 is turned ON, the signal charge of the photodiode PD4 is transferred to the floating diffusion FD, and signal charge of the PD3 and signal charge of the PD4 are accumulated in the floating diffusion FD.

At next timing t7, when the selection signal SEL is turned ON, a voltage of signal charge (PD3+PD4) accumulated in the floating diffusion FD is amplified by the transistor Tr7 and read from the output terminal OUT.

At next timing t8, since each control signal TX1 to TX4, the selection signal SEL and the reset signal RES are OFF, there is no change from the state at timing t7.

Figure 6:
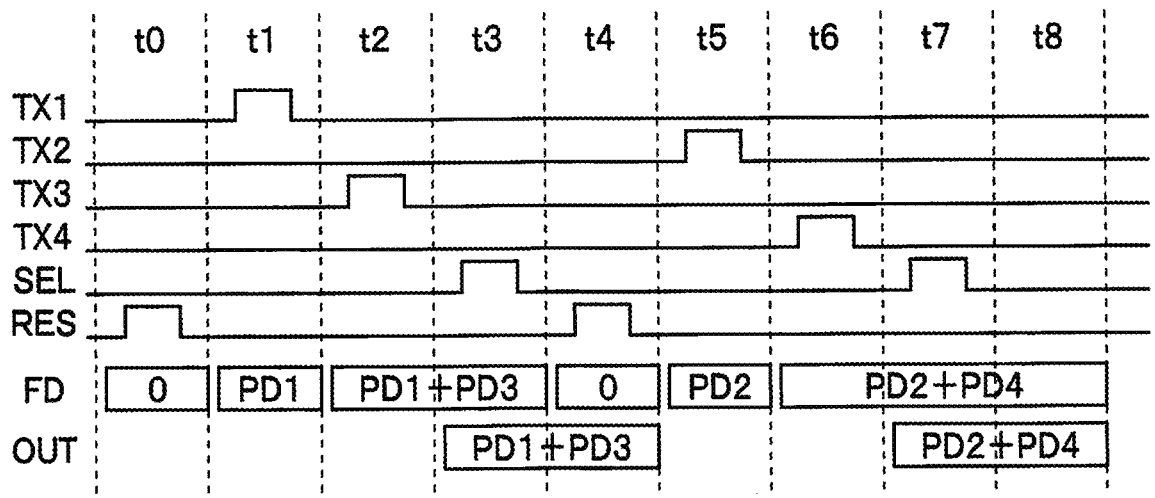
FIG. 6 is a timing chart illustrating an example of driving the image pickup device when pixels having a 4PD pixel structure according to Embodiment 1 of the present invention perform vertical 2-pixel addition.

FIG. 6 is a timing chart illustrating an example of driving the image pickup device 3 when pixels having a 4PD pixel structure perform horizontal 2-pixel addition.

At next timing t0, when the reset signal RES is turned ON, the floating diffusion FD is reset.

At next timing t1, when the control signal TX1 is turned ON, the signal charge of the photodiode PD1 is transferred to the floating diffusion FD.

At next timing t2, when the control signal TX3 is turned ON, the signal charge of the photodiode PD3 is transferred to the floating diffusion FD, and the signal charge of the PD1 and the signal charge of the PD3 are accumulated in the floating diffusion FD.

At next timing t3, when the selection signal SEL is turned ON, a voltage of signal charge (PD1+PD3) accumulated in the floating diffusion FD is amplified by the transistor Tr7 and read from the output terminal OUT.

At next timing t4, when the reset signal RES is turned ON, the floating diffusion FD is reset.

At next timing t5, when the control signal TX2 is turned ON, the signal charge of the photodiode PD2 is transferred to the floating diffusion FD.

At next timing t6, when the control signal TX4 is turned ON, the signal charge of the photodiode PD4 is transferred to the floating diffusion FD, and the signal charge of the PD2 and the signal charge of the PD4 are accumulated in the floating diffusion FD.

At next timing t7, when the selection signal SEL is turned ON, a voltage of signal charge (PD2+PD4) accumulated in the floating diffusion FD is amplified by the transistor Tr7 and read from the output terminal OUT.

At next timing t8, since each control signal TX1 to TX4, the selection signal SEL and the reset signal RES are OFF, there is no change from the state at timing t7.

Note that although not shown, 4-pixel addition is also performed under similar control.

In this way, pixel addition can be performed at an analog stage in the vertical scanning section 21 and the pixel section 22, and further, for example, pixel addition averaging can also be performed at an analog stage in the analog processing section 23, but the averaging is not limited to the analog stage. Pixel addition or pixel addition averaging may be performed by the memory section 25 to the output section 27 after the analog signal is converted to a digital signal by the ADC processing section 24. Alternatively, for example, it may be naturally possible to generate pixel data of P1 to P3 shown below at an analog stage and generate pixel data of P4 and P5 at a digital stage, that is, sharing the process between the analog and digital stages.

FIG. 7 is a diagram illustrating an arrangement of focus detection pixel data P0 obtained by reading all pixels from the image pickup device 3 having the 4PD pixel structure.

As described above, in the case of the 4PD pixel structure, the position of one pixel where one color filter having a normal 1PD pixel structure is arranged is divided into four top, bottom, left and right portions, and four pixels are arranged. For example, when a pixel address in a row direction is represented by m and a pixel address in a column direction is represented by n, Gr pixels at pixel addresses (1,1), (1,2), (2,1) and (2,2) in FIG. 7 correspond to pixels resulting from dividing one Gr pixel in the 1PD pixel structure into four portions.

There are several schemes for reading all pixels of focus detection pixel data P0 $(m, n)$ divided in horizontal and vertical directions, and, for example, pixels are read from the pixel section 22 according to a simple reading scheme as follows.

$$P0(1,1), P0(1,2), \ldots$$

Furthermore, according to a subtraction reading scheme, pixels are read, for example, as follows.

$$[P0(1,1)+P0(1,2)+P0(2,1)+P0(2,2)],[P0(1,2)+P0(2,1)+P0(2,2)],[P0(2,1)+P0(2,2)],[P0(2,2)], \ldots$$

The pixel data read under the aforementioned subtraction reading scheme is transmitted to the focus detection section 7 via the signal I/F 4, and the focus detection section 7 performs the following processing and focus detection pixel data divided in vertical and horizontal directions is reconstructed.

That is, following A to D are assumed:

$$A=[P0(1,1)+P0(1,2)+P0(2,1)+P0(2,2)]$$

$$B=[P0(1,2)+P0(2,1)+P0(2,2)]$$

$$C=[P0(2,1)+P0(2,2)]$$

$$D=[P0(2,2)]$$

At this time, D is focus detection pixel data P0 (2, 2). Furthermore, the focus detection section 7 reconstructs each piece of focus detection pixel data other than P0 (2, 2) by performing the following subtractions:

$$A-B=P0(1,1), B-C=P0(1,2), C-D=P0(2,1)$$

Furthermore, since A is image pixel data, when the aforementioned subtraction reading scheme is adopted, the signal I/F 4 may transmit only A to the image processing section 5. Therefore, the calculation load on the image processing section 5 required for calculating A is reduced.

Note that since there are a plurality of types of the subtraction reading scheme, only one type is described here as an example, but an arbitrary type of subtraction reading scheme may be used.

Next, FIG. 8 is a diagram illustrating an arrangement of image pixel data P1 read from the image pickup device 3 having the 4PD pixel structure by performing pixel addition.

Assuming that a pixel coordinate address at an arrangement of image pixel data P1 is represented by contents in parentheses of P1 $(m, n)$, the image pickup device 3 performs the following addition to calculate image pixel data P1 $(m, n)$.

$$P1(1, 1) = P0(1, 1) + P0(1, 2) + P0(2, 1) + P0(2, 2)$$
$$P1(1, 2) = P0(3, 1) + P0(3, 2) + P0(4, 1) + P0(4, 2)$$
$$\ldots$$

Thus, one piece of pixel data shown on the left side of the numerical expression is pixel-synthesized from a plurality of pieces of pixel data shown on the right side.

The calculation results are sequentially read as follows:

$$P1(1,1), P1(1,2), \ldots$$

Next, FIG. 9 is a diagram illustrating an arrangement of focus detection pixel data P2 for performing phase difference detection in a horizontal direction read from the image pickup device 3 having the 4PD pixel structure by performing pixel addition.

There are several schemes for reading focus detection pixel data for phase difference detection in the horizontal direction and if a pixel address in an arrangement of focus detection pixel data P2 is represented by contents in parentheses of P2 $(m, n)$, the image pickup device 3 performs the following addition to calculate the focus detection pixel data P2 $(m, n)$ under a simple reading scheme (data is read from the left and right sides separately).

$$P2(1, 1) = P0(1, 1) + P0(1, 2)$$
$$P2(2, 1) = P0(2, 1) + P0(2, 2)$$
$$\ldots$$

Thus, one piece of pixel data shown on the left side is pixel-synthesized from a plurality of pieces of pixel data shown on the right side of the above-described numerical expression (the same applies hereinafter).

Furthermore, under a first subtraction reading scheme (left, left+right), the image pickup device 3 performs the following addition to calculate focus detection pixel data P2 $(m, n)$.

$$P2(1, 1) = P0(1, 1) + P0(1, 2)$$
$$P2(2, 1) = P0(1, 1) + P0(1, 2) + P0(2, 1) + P0(2, 2)$$
$$\ldots$$

Under a second subtraction reading scheme (left+right, right), the image pickup device 3 performs the following addition to calculate focus detection pixel data P2 $(m, n)$.

$$P2(1, 1) = P0(1, 1) + P0(1, 2) + P0(2, 1) + P0(2, 2)$$
$$P2(2, 1) = P0(2, 1) + P0(2, 2)$$
$$\ldots$$

The result calculated under any one scheme is sequentially read as follows.

$$P2(1,1), P2(2,1), \ldots$$

Furthermore, when the first subtraction reading scheme is adopted, the signal I/F 4 may transmit only image pixel data resulting from adding up four photodiode outputs corresponding to one micro lens L to the image processing section 5 such as:

$$P2(2,1)=P0(1,1)+P0(1,2)+P0(2,1)+P0(2,2)$$

Similarly, when the second subtraction reading scheme is adopted, the signal I/F 4 may transmit only image pixel data resulting from adding up four photodiode outputs corresponding to one micro lens L to the image processing section 5 such as:

$$P2(1,1)=P0(1,1)+P0(1,2)+P0(2,1)+P0(2,2)$$

No matter which subtraction reading scheme may be used, the calculation load on the image processing section 5 required for calculating [P0 (1, 1)+P0 (1, 2)+P0 (2, 1)+P0 (2, 2)] is reduced.

On the other hand, when the first subtraction reading scheme (left, left+right) is used, the focus detection section 7 performs a process of reconstructing right focus detection pixel data by calculating:

$$P2(2,1)-P2(1,1)=P0(2,1)+P0(2,2)$$

When the second subtraction reading scheme (left+right, right) is used, the focus detection section 7 performs a process of reconstructing left focus detection pixel data by calculating:

$$P2(1,1)-P2(2,1)=P0(1,1)+P0(1,2)$$

FIG. 10 is a diagram illustrating an arrangement of focus detection pixel data P3 for performing phase difference detection in a vertical direction read from the image pickup device 3 having the 4PD pixel structure by performing pixel addition.

There are several schemes of reading focus detection pixel data for phase difference detection in the vertical direction, and if a pixel address in the arrangement of the focus detection pixel data P3 is represented by contents in parentheses of P3 (m, n), under a simple reading scheme (data is read from the top and bottom sides separately), the image pickup device 3 performs the following addition to calculate focus detection pixel data P3 (m, n):

$$P3(1, 1) = P0(1, 1) + P0(2, 1)$$
$$P3(1, 2) = P0(1, 2) + P0(2, 2)$$
$$\ldots$$

Furthermore, under the first subtraction reading scheme (top, top+bottom), the image pickup device 3 performs the following addition to calculate focus detection pixel data P3 (m, n):

$$P3(1, 1) = P0(1, 1) + P0(2, 1)$$
$$P3(1, 2) = P0(1, 1) + P0(2, 1) + P0(1, 2) + P0(2, 2)$$
$$\ldots$$

Furthermore, under the second subtraction reading scheme (top+bottom, bottom), the image pickup device 3 performs the following addition to calculate focus detection pixel data P3 (m, n):

$$P3(1, 1) = P0(1, 1) + P0(2, 1) + P0(1, 2) + P0(2, 2)$$
$$P3(1, 2) = P0(1, 2) + P0(2, 2)$$
$$\ldots$$

The results calculated under any one of the schemes are sequentially read as follows:

$$P3(1,1), P3(1,2), \ldots$$

Furthermore, when the first subtraction reading scheme is adopted, the signal IN 4 may transmit only image pixel data resulting from adding up the four photodiode outputs corresponding to one micro lens L to the image processing section 5 such as:

$$P3(1,2)=P0(1,1)+P0(2,1)+P0(1,2)+P0(2,2)$$

Similarly, when the second subtraction reading scheme is adopted, the signal I/F 4 may transmit only image pixel data resulting from adding up the four photodiode outputs corresponding to one micro lens L to the image processing section 5 such as:

$$P3(1,1)=P0(1,1)+P0(2,1)+P0(1,2)+P0(2,2)$$

No matter which subtraction reading scheme may be used, the calculation load on the image processing section 5 required for calculating [P0 (1, 1)+P0 (1, 2)+P0 (2, 1)+P0 (2, 2)] is reduced.

On the other hand, when the first subtraction reading scheme (top, top+bottom) is used, the focus detection section 7 performs a process of reconstructing bottom focus detection pixel data by calculating:

$$P3(1,2)-P3(1,1)=P0(1,2)+P0(2,2)$$

When the second subtraction reading scheme (top+bottom, bottom) is used, the focus detection section 7 performs a process of reconstructing top focus detection pixel data by calculating:

$$P3(1,1)-P3(1,2)=P0(1,1)+P0(2,1)$$

Furthermore, FIG. 11 is a diagram illustrating an arrangement of V2/2H2/2 mixed reading pixel data P4 read from the image pickup device 3 by performing addition averaging.

When the pixel address in the arrangement of the V2/2H2/2 mixed reading pixel data P4 is represented by contents in parentheses of P4 (m, n), the image pickup device 3 performs, for example, the following addition averaging to calculate V2/2H2/2 mixed reading pixel data P4(m, n):

$$P4(1,1)=(P1(1,1)+P1(1,3)+P1(3,1)+P1(3,3))/4$$

Here, the respective pixel addresses (1, 1), (1, 3), (3, 1) and (3, 3) associated with P1 indicate that addition averaging is performed on pixel data corresponding to four pixels of the same color within the (4×4) P1 pixel region of (1, 1) to (4, 4) (however, Gr is distinguished from Gb). Although an example of calculation on the Gr pixel has been shown, calculations on the other color pixels are likewise performed.

Figures 12, 13:
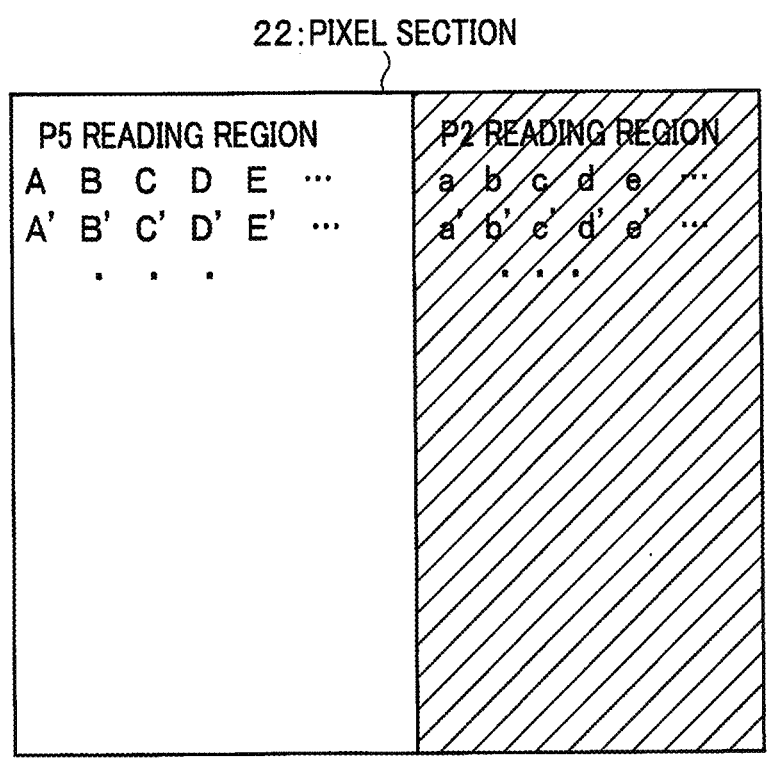
FIG. 12 is a diagram illustrating an arrangement of V2/3H3/3 mixed reading pixel data P5 read from the image pickup device according to Embodiment 1 of the present invention by performing addition averaging.
FIG. 13 is a diagram illustrating an example of setting a P5 reading region and a P2 reading region in a pixel section of the image pickup device according to Embodiment 1 of the present invention.

FIG. 12 is a diagram illustrating an arrangement of V2/3H3/3 mixed reading pixel data P5 read from the image pickup device 3 by performing addition averaging.

When the pixel address in the arrangement of the V2/3H3/3 mixed reading pixel data P5 is represented by contents in parentheses of P5 (m, n), the image pickup device 3 performs, for example, the following addition averaging to calculate V2/3H3/3 mixed reading pixel data P5 (m, n).

$$P5(1,1)=(P1(1,1)+P1(1,3)+P1(1,5)+P1(3,1)+P1(3,3)+P1(3,5))/6$$

Here, the respective pixel addresses (1, 1), (1, 3), (1, 5), (3, 1), (3, 3) and (3, 5) associated with P1 indicate that addition averaging is performed on pixel data corresponding to the six pixels of the same color except for the fifth row (however, Gr is distinguished from Gb) within (6×6) P1 pixel region of (1, 1) to (6, 6). An example of calculation of Gr pixels has been described here, but calculations of other pixels will be performed in the like manner.

Note that although an example of mixed reading has been shown in FIG. 11 and FIG. 12, decimation reading may also be performed instead of mixed reading.

In image pickup device reading modes P0 to P5 in which the aforementioned pixel data P0 to P5 are read from the image pickup device 3 (image pickup device reading modes are also represented using the same reference numerals P0 to P5 as pixel data), the image pickup apparatus is used differently according to, for example, the following photographing modes:

| Camera photographing mode | Image pickup device reading mode |
|---|---|
| Still image | P1 |
| Live view | P5 |
| 4K movie | P1 |
| 1080 HD movie | P4 |
| Focus detection | P0 or P2 or P3 |

Next, FIG. 13 is a diagram illustrating an example of setting a P5 reading region and a P2 reading region in the pixel section 22 of the image pickup device 3.

FIG. 13 shows an example where when a live view is in progress, focus detection is performed simultaneously and one part (left side in the example in FIG. 13) of the pixel section 22 and the other part (right side in the example in FIG. 13) of the pixel section 22 are set in the P5 reading region and the P2 reading region respectively (however, FIG. 13 shows only an example; a so-called AF region set as the P2 reading region may be set at the center of the screen, a plurality of AF regions may be set within a screen or may be set to suit a specific object).

Assume that the V2/3H3/3 mixed reading pixel data P5 is arranged in the P5 reading region such that on the first row: A, B, C, . . . , and on the second row: A', B', C', . . . , and the pixel data P2 is arranged in the P2 reading region such that on the first row: a, b, c, . . . , and on the second row: a', b', c', . . . .

Figure 14:
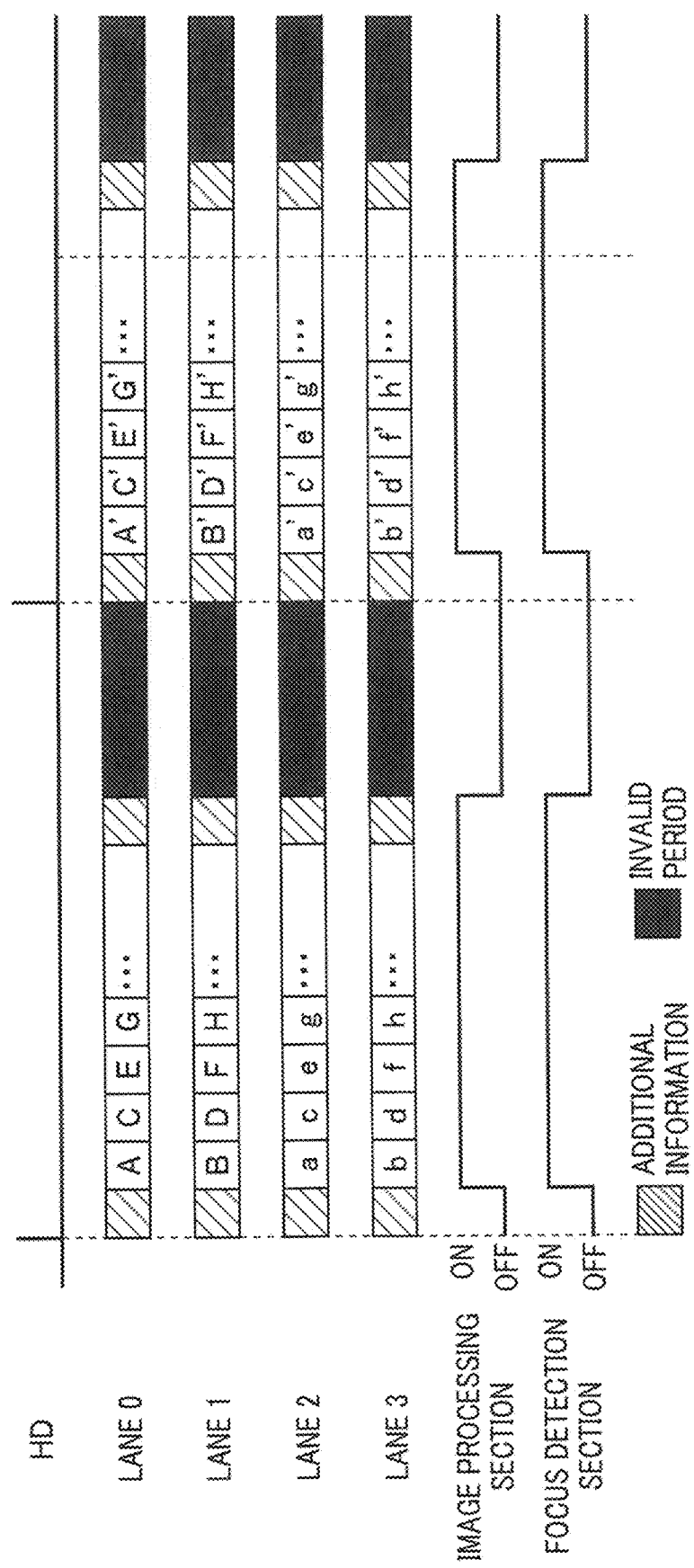
FIG. 14 is a timing chart illustrating a first operation example of adding additional information indicating a characteristic to a pixel data sequence and outputting the pixel data sequence from the image pickup device according to Embodiment 1 of the present invention.

FIG. 14 is a timing chart illustrating a first operation example of adding additional information indicating a characteristic to a pixel data sequence and outputting the pixel data sequence from the image pickup device 3.

First, an example will be described in the present embodiment where the number of lanes for which pixel data is outputted from the image pickup device 3 is 4 (lanes 0 to 3). However, it goes without saying that the number of lanes is not limited to 4.

The image pickup device 3 outputs a pixel data sequence for each row based on timing of the horizontal synchronization signal HD.

The vertical scanning section 21 to the output section 27 which constitute a pixel data sequence generation section at this time are configured to array a plurality of pieces of pixel data according to the characteristic of pixel data and generate a pixel data sequence composed of the pixel data having the same characteristic.

To be more specific, the pixel data sequence generation section generates a pixel data sequence in which only pixel data P5 is arrayed and a pixel data sequence in which only pixel data P2 is arrayed depending on the characteristic as to whether the pixel data is P5 or P2.

As shown in FIG. 14, the pixel data sequence generation section sequentially performs processes of forming a pixel data sequence composed of odd-numbered pixel data on a first row of the P5 reading region shown in FIG. 13 for lane 0, forming a pixel data sequence composed of even-numbered pixel data on the first row of the P5 reading region for lane 1, forming a pixel data sequence composed of odd-numbered pixel data on the first row of the P2 reading region for lane 2 and forming a pixel data sequence composed of even-numbered pixel data on the first row of the P2 reading region for lane 3, while changing a row for each horizontal synchronization signal HD.

That is, in the example shown in FIG. 14, the image pixel data (P5) and the focus detection pixel data (P2) are assigned to different lanes and outputted.

The output section 27, which is an information adding section, adds to a pixel data sequence (preferably to the head of the pixel data sequence as shown in FIG. 14) generated by the pixel data sequence generation section, additional information indicating a characteristic of the pixel data sequence. The additional information is added even when the pixel data sequence is an invalid pixel data sequence as shown in FIG. 14.

The signal I/F 4 extracts additional information from the output of the image pickup device 3 and transmits the additional information to the system control section 11.

The system control section 11, which is a control section, is configured to determine, based on the additional information inputted from the signal I/F 4, whether or not valid pixel data is inputted to the data processing section and perform control so as to supply power and a clock to the data processing section when it is determined that the valid pixel data is inputted to the data processing section, or stop at least a clock supply to the data processing section when it is determined that the valid pixel data is not inputted to the data processing section. That is, the system control section 11 performs such determinations and control on the image processing section 5 and the focus detection section 7, which are the data processing section, respectively.

When power consumption of the data processing section (the image processing section 5 and the focus detection section 7) is controlled, the power consumption is controlled by controlling a clock supply or a power supply. A clock can be supplied/stopped on a relatively short time scale, whereas a longer control period is preferably taken to supply/stop power than to supply/stop a clock (for example, it is difficult to stop a power supply for a short period of time such as a period of time during which pixel data corresponding to one pixel is transmitted).

Thus, when it is determined that valid pixel data is not inputted to the data processing section, the system control section 11 performs control so as to stop at least the clock supply to the image processing section 5 and the focus detection section 7 respectively.

Moreover, when it is determined that valid pixel data is not inputted to the data processing section and it is possible to control the power supply, the system control section 11 performs control so as to stop the power supply to the data processing section that is to the image processing section 5 and the focus detection section 7 respectively.

To be more specific, as shown in FIG. 14, for a period during which valid pixel data P5 and P2 are transmitted on lanes 0 to 3, the image processing section 5 and the focus detection section 7 are turned on and both the clock and power are supplied, whereas for a period during which none of the valid pixel data P5 and P2 is transmitted (invalid period), the image processing section 5 and the focus detection section 7 are turned OFF and the clock supply is stopped or both clock and power supplies are stopped.

Figure 15:
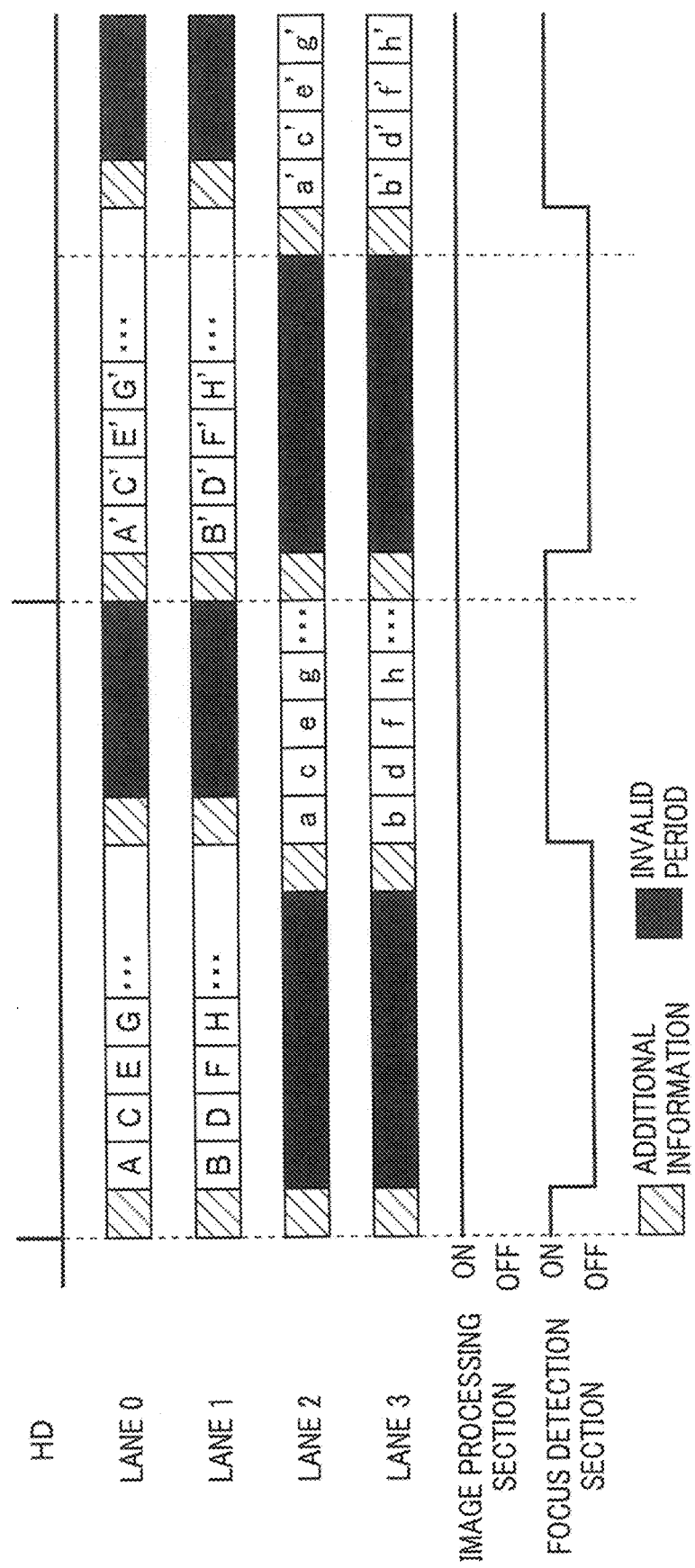
FIG. 15 is a timing chart illustrating a second operation example of adding additional information indicating a characteristic to a pixel data sequence and outputting the pixel data sequence from the image pickup device according to Embodiment 1 of the present invention.

Next, FIG. 15 is a timing chart illustrating a second operation example of adding additional information indicating a characteristic to a pixel data sequence and outputting the pixel data sequence from the image pickup device 3.

In the aforementioned example in FIG. 14, transmission of the pixel data P5 on lanes 0 and 1 and transmission of the pixel data P2 on lanes 2 and 3 are simultaneously started in accordance with the timing of the horizontal synchronization signal HD. In contrast, in the example shown in FIG. 15, during a 1 horizontal synchronization period separated by the horizontal synchronization signal HD, transmission timing of the pixel data P5 on lanes 0 and 1 is differentiated from transmission timing of the pixel data P2 on lanes 2 and 3 as much as possible.

More specifically, transmission of the pixel data P5 on lanes 0 and 1 is performed from the starting time point of the 1 horizontal synchronization period so that an invalid period is generated in the last half part of the 1 horizontal synchronization period and transmission of the pixel data P2 on lanes 2 and 3 is performed such that an invalid period is generated in the first half part of the 1 horizontal synchronization period and the transmission of the pixel data P2 is finished at an end point of time of the 1 horizontal synchronization period.

However, the transmission order of the pixel data P5 and the pixel data P2 during the 1 horizontal synchronization period may be reversed, the transmission of the pixel data P2 on lanes 2 and 3 may be performed in the first half part of the 1 horizontal synchronization period and the transmission of the pixel data P5 on lanes 0 and 1 may be performed in the last half of the 1 horizontal synchronization period.

The pixel data P5 is used for the image processing section 5 to generate an image but the pixel data P5 is not used for the focus detection section 7. In contrast, the pixel data P2 is used not only for phase difference detection in the focus detection section 7 but also for the image processing section 5 to generate an image.

Therefore, in the processing shown in FIG. 14, the load on the image processing section 5 in the first half part of the 1 horizontal synchronization period becomes large. Thus, the processing shown in FIG. 15 is intended to prevent concentration of load of the image processing section 5 and distribute the load within the 1 horizontal synchronization period over an area as wide as possible.

For this reason, the image processing section 5 is always kept ON (however, when there is little pixel data to be transmitted (when the sum of the transmission period of the pixel data P5 and the transmission period of the pixel data P2 is shorter than the 1 horizontal synchronization period and an invalid period is generated), the image processing section 5 may be naturally turned OFF; the same also applies to FIG. 16 below), the focus detection section 7 is turned ON only for a period during which the pixel data P2 is inputted (that is, the focus detection section 7 is turned OFF for a period during which the pixel data P2 is not inputted).

Figure 16:
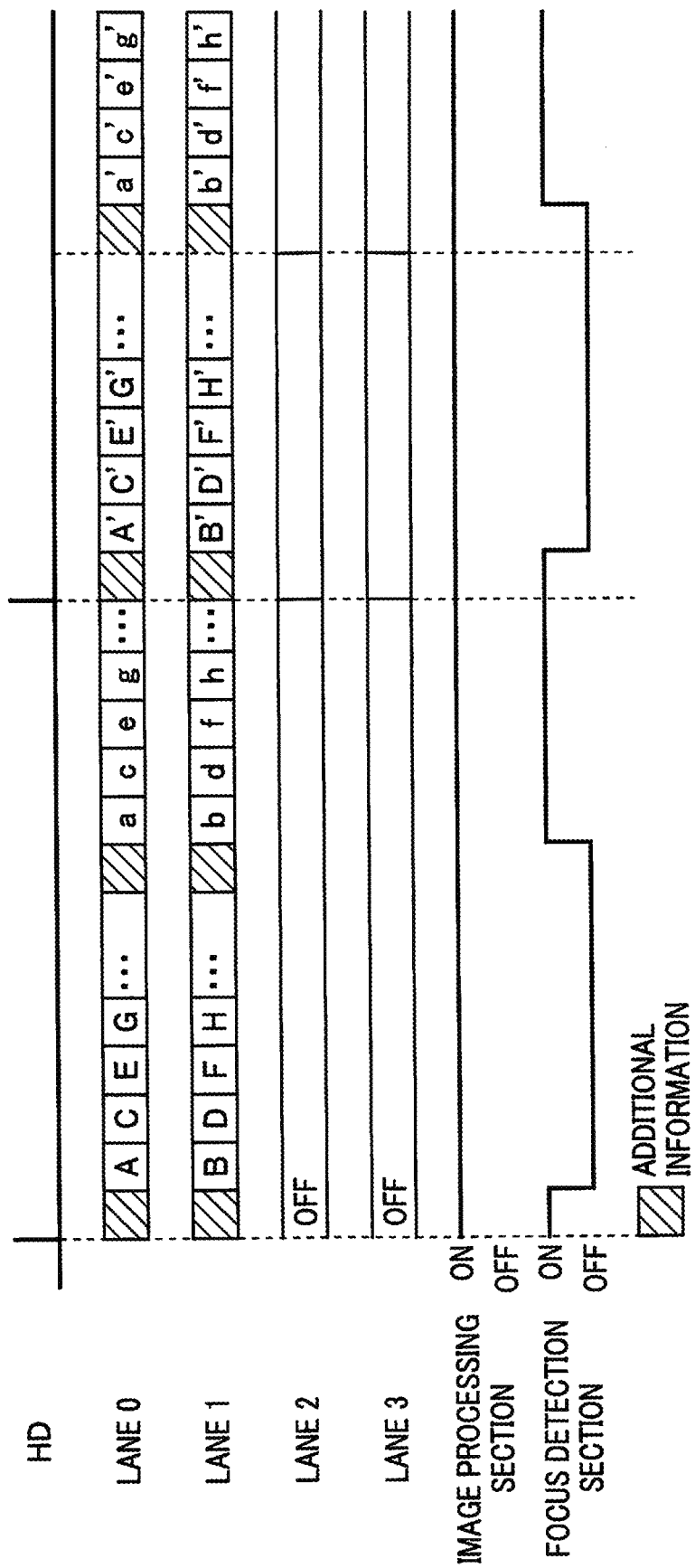
FIG. 16 is a timing chart illustrating a third operation example of adding additional information indicating a characteristic to a pixel data sequence and outputting the pixel data sequence from the image pickup device according to Embodiment 1 of the present invention.

FIG. 16 is a timing chart illustrating a third operation example of adding additional information indicating a characteristic to a pixel data sequence and outputting the pixel data sequence from the image pickup device 3.

In the aforementioned examples in FIG. 14 and FIG. 15, no restrictions are imposed on the lanes used for transmission of pixel data. In the example shown in FIG. 16, the number of lanes used is limited to two and pixel data is transmitted using only two authorized lanes.

That is, in the example shown in FIG. 16, lanes 2 and 3 are turned OFF to prohibit use of lanes 2 and 3 for transmission of pixel data, the pixel data P5 is transmitted in the first half part of the 1 horizontal synchronization period using lanes 0 and 1 and the pixel data P2 is then (e.g., in the last half part of the 1 horizontal synchronization period) transmitted using lanes 0 and 1.

In the example shown in FIG. 16 in substantially the same way as in the example shown in FIG. 15, the image processing section 5 is always kept ON and the focus detection section 7 is turned ON only for a period during which the pixel data P2 is inputted.

Note that in the examples shown in FIG. 14 and FIG. 15, the image pixel data (P5) is transmitted using only lanes 0 and 1 and the focus detection pixel data (P2) is transmitted using only lanes 2 and 3, and so the signal I/F 4 transfers only pixel data of lanes 0 and 1 to the image processing section 5 and sorts pixel data of lanes 2 and 3 to be transferred to the image processing section 5 and the focus detection section 7.

On the other hand, in the example shown in FIG. 16, since the image pixel data (P5) and the focus detection pixel data (P2) are transmitted using only lanes 0 and 1, the signal I/F 4 performs sorting to transfer only the pixel data P5 to the image processing section 5 for a transmission period of the pixel data P5 for the 1 horizontal synchronization period of lanes 0 and 1 and transfer only the pixel data P2 to the image processing section 5 and the focus detection section 7 for a transmission period of the pixel data P2.

Figure 17:
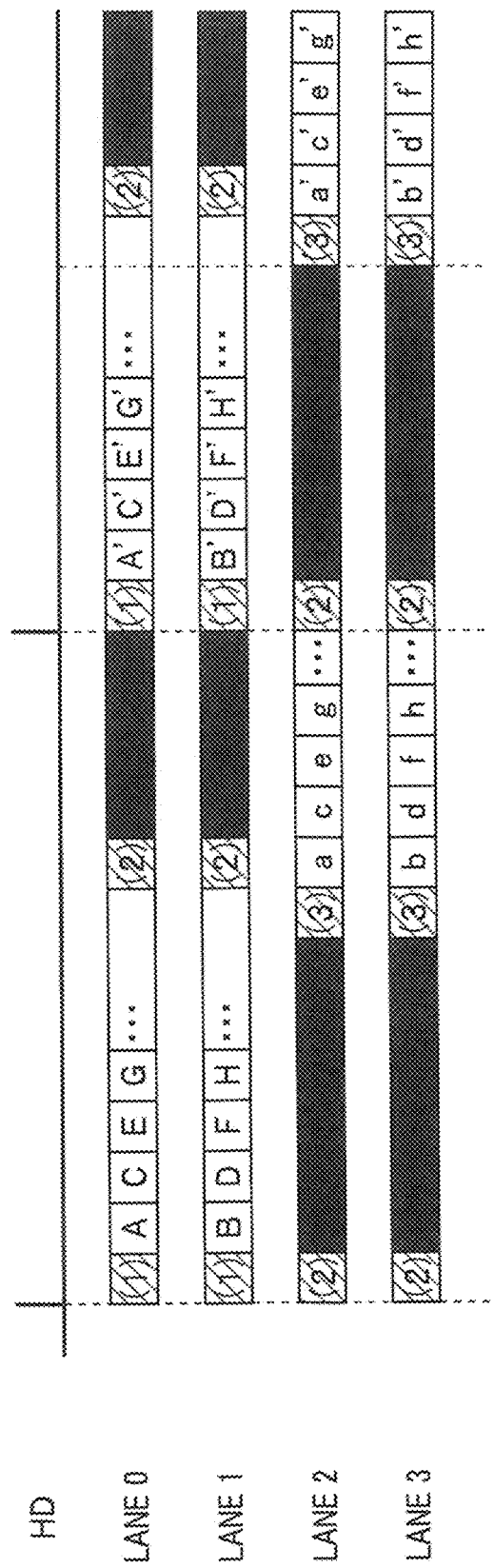
FIG. 17 is a diagram illustrating a specific example of the additional information in the second operation example in FIG. 15 according to Embodiment 1 of the present invention.

Next, FIG. 17 is a diagram illustrating a specific example of additional information in the second operation example in FIG. 15 and FIG. 18 is a diagram illustrating specific examples of flags included in the additional information in FIG. 17.

The system control section 11 instructs the image pickup device 3 about image pickup device reading modes P0 to P5 in accordance with the set photographing mode. The output section 27 of the image pickup device 3 is configured to generate additional information as shown in FIG. 18, add and output the additional information to the pixel data sequence generated according to the instruction.

The additional information in the present embodiment includes a plurality of flags as shown in FIG. 18.

To be more specific, the additional information is constructed as 4-bit information (or 5-bit or higher number-bit to correspond to an expansion in the future), and an image pixel flag, a focus detection pixel flag, an image synthesis processing flag and a focus detection subtraction processing flag are stored in bit 0, bit 1, bit 2 and bit 3 respectively.

When ON, the image pixel flag (bit 0) suggests that the image processing section 5 should be turned ON.

Therefore, when the image pixel flag is ON, the system control section 11 determines that valid pixel data is inputted to the image processing section 5, performs control so as to supply power and a clock to the image processing section 5 and cause the image processing section 5 to perform image processing or when the image pixel flag is OFF, the system control section 11 performs control so as to stop at least a clock supply to the image processing section 5.

When ON, the focus detection pixel flag (bit 1) suggests that the focus detection section 7 should be turned ON.

Therefore, when the focus detection pixel flag is ON, the system control section 11 determines that valid pixel data is inputted to the focus detection section 7, performs control so as to supply power and a clock to the focus detection section 7, cause the focus detection section 7 to perform focus detection or when the focus detection pixel flag is OFF, the system control section 11 performs control so as to stop at least a clock supply to the focus detection section 7.

When ON, the image synthesis processing flag (bit 2) is a flag intended to cause the image processing section 5 to perform a process of synthesizing image pixel data (P1, P4, P5) from the focus detection pixel data (P0, P2, P3).

When the image pixel flag is ON and further the image synthesis processing flag is ON (note that when the image pixel flag is OFF, the image synthesis processing flag is necessarily OFF), the system control section 11 causes the image processing section 5 to perform a process of synthesizing image pixel data from the focus detection pixel data obtained from pixels at different positions relative to the micro lens L.

The focus detection subtraction processing flag (bit 3) is a flag configured to turn ON when the focus detection pixel data (P2 or P3) is generated under a subtraction reading scheme (turned OFF when generated under a simple reading scheme).

When the focus detection pixel flag is ON and further the focus detection subtraction processing flag is ON (note that when the focus detection pixel flag is OFF, the focus detection subtraction processing flag is necessarily OFF), the system control section 11 causes the focus detection section 7 to perform the aforementioned focus detection subtraction process and reconstruct focus detection pixel data.

Note that since there are a plurality of types of subtraction reading schemes as described above, it may be possible to add a bit to determine which subtraction reading scheme is used and form the focus detection subtraction processing flag with a plurality of bits.

An example of including a plurality of flags as additional information has been described above, but the configuration is not limited to this. Additional information may be configured so as to include only one flag (for example, a flag indicating whether or not an image pixel data sequence (that is, whether an image pixel data sequence or a pixel data sequence for other purposes)).

As shown in FIG. 17, additional information shown in (1) in FIG. 18, that is, additional information indicating that the image pixel flag is ON "1", the focus detection pixel flag is OFF "0", the image synthesis processing flag is OFF "0" and the focus detection subtraction processing flag is OFF "0" is added by the output section 27 of the pickup device 3 to, for example, the head of the pixel data sequence composed of the pixel data P5.

The system control section 11 turns ON the image processing section 5 according to the additional information indicating that the image pixel flag is ON "1" and turns OFF the focus detection section 7 according to the additional information indicating that the focus detection pixel flag is OFF "0."

Furthermore, the system control section 11 performs control so as to dispense with a synthesis process of the image pixel data from the focus detection pixel data by the image processing section 5 according to the additional information indicating that the image synthesis processing flag is OFF "0" and performs control so as to dispense with a focus detection subtraction process by the focus detection section 7 according to the additional information indicating that the focus detection subtraction processing flag is OFF "0." However, since the focus detection section 7 is OFF, control of the processing contents of the focus detection section 7 becomes unnecessary.

The output section 27 of the image pickup device 3 adds the additional information shown by (2) in FIG. 18, that is, additional information indicating that the image pixel flag is OFF "0", the focus detection pixel flag is OFF "0", the image synthesis processing flag is OFF "0", and the focus detection subtraction processing flag is OFF "0" to, for example, the head of the invalid pixel data sequence. That is, this additional information includes information indicating that the pixel data sequence is an invalid pixel data sequence.

The system control section 11 turns OFF the image processing section 5 when the additional information indicates that the image pixel flag is OFF "0" and turns OFF the focus detection section 7 when the additional information indicates that the focus detection pixel flag is OFF "0." Thus, when the additional information includes information indicating that the pixel data sequence is an invalid pixel data sequence, the system control section 11 performs control so as to at least stop both a clock supply to the image processing section 5 and a clock supply to the focus detection section 7.

Furthermore, the system control section 11 performs control so as to dispense with a synthesis process of image pixel data from the focus detection pixel data by the image processing section 5 according to the additional information indicating that the image synthesis processing flag is OFF "0" and performs control so as to dispense with a focus detection subtraction process by the focus detection section 7 according to the additional information indicating that the focus detection subtraction processing flag is OFF "0." However, since both the image processing section 5 and the focus detection section 7 are turned OFF, control of processing contents of the image processing section 5 and control of processing contents of the focus detection section 7 become both unnecessary.

Next, the output section 27 of the image pickup device 3 adds the additional information shown by (3) in FIG. 18, that is, additional information indicating that the image pixel flag is ON "1", that the focus detection pixel flag is ON "1", that the image synthesis processing flag is ON "1", and that the focus detection subtraction processing flag is OFF "0" to, for example, the head of the pixel data sequence composed of the pixel data P2. Therefore, the example shown in FIG. 18 assumes that the focus detection pixel data P2 is generated according to a simple reading scheme.

The system control section 11 turns ON the image processing section 5 according to the additional information indicating that the image pixel flag is ON "1" and turns ON the focus detection section 7 according to the additional information indicating that the focus detection pixel flag is ON "1."

Furthermore, the system control section 11 performs control so as to cause the image processing section 5 to perform a process of synthesizing image pixel data from the focus detection pixel data according to the additional information indicating that the image synthesis processing flag is ON "1" and performs control so as to dispense with the focus detection subtraction process by the focus detection section 7 according to the additional information indicating that the focus detection subtraction processing flag is OFF "0."

Thus, the additional information includes information indicating an aspect of pixel synthesis by an in-device processing section (image synthesis processing flag, focus detection subtraction processing flag) and the system control section 11 performs control so as to change the process in the data processing section (image processing section 5, focus detection section 7) based on the information indicating the aspect of pixel synthesis included in the additional information.

Figure 19:
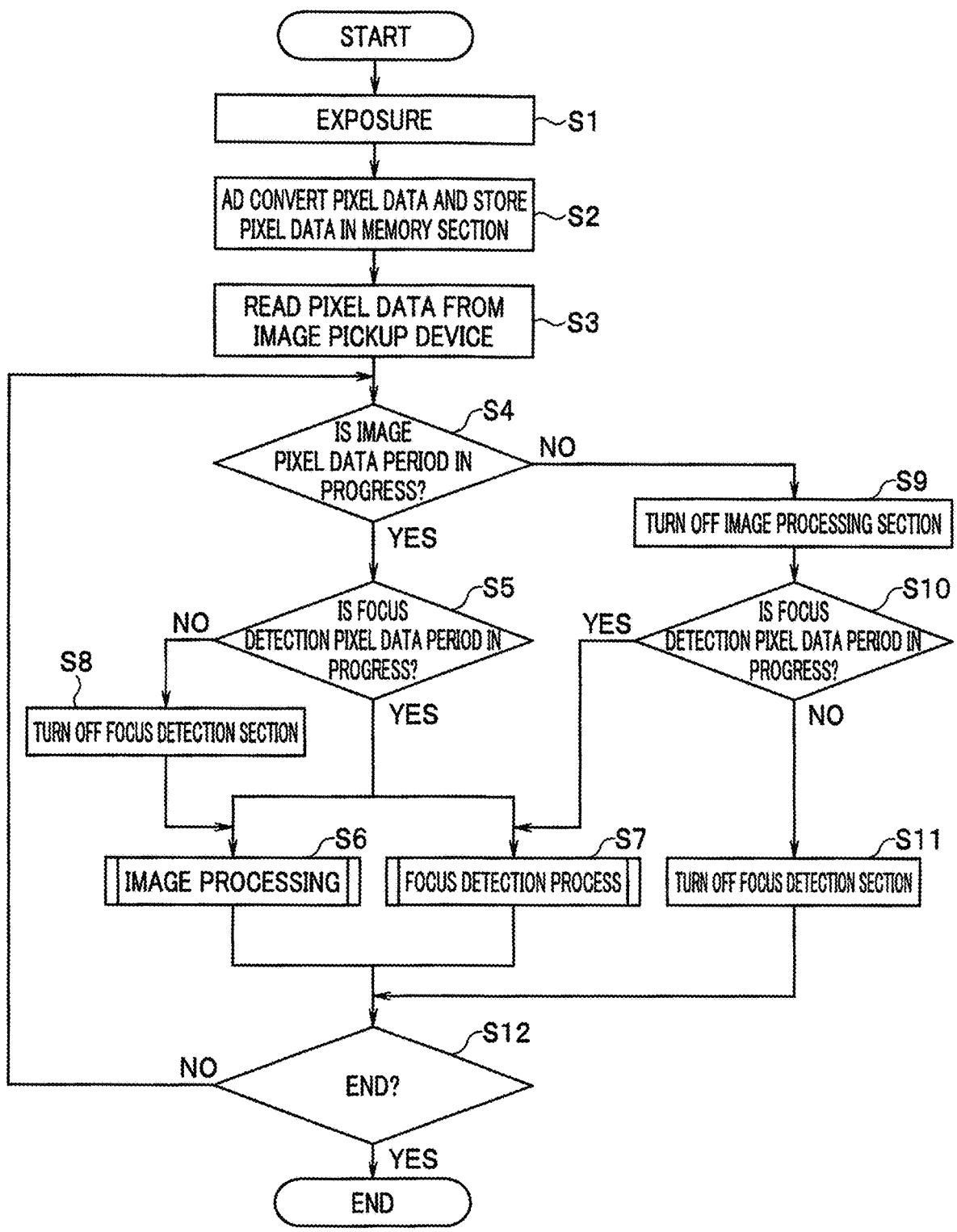
FIG. 19 is a flowchart illustrating operation of the image pickup apparatus according to Embodiment 1 of the present invention.

FIG. 19 is a flowchart illustrating operation of the image pickup apparatus.

When the process is started, each pixel of the image pickup device 3 exposes an object image formed on the image pickup device 3, photoelectrically converts the exposed object image, accumulates charge and generates pixel data (step S1).

Next, through scanning by the vertical scanning section 21 in accordance with an image pickup device reading mode, pixel data sequentially read from the pixel section 22 is processed by the analog processing section 23, AD-converted by the ADC processing section 24 and stored in the memory section 25 (step S2).

The pixel data stored in the memory section 25 is read from the output section 27 of the image pickup device 3 as a pixel data sequence to which additional information is added (step S3).

The signal I/F 4 extracts additional information from the data inputted from the image pickup device 3, transmits the extracted additional information to the system control section 11 and the system control section 11 determines whether or not an image pixel data period during which the image processing section 5 should be turned ON is in progress based on the image pixel flag of the additional information (step S4).

When it is determined that the image pixel data period is in progress, the system control section 11 further determines whether or not a focus detection pixel data period during which the focus detection section 7 should be turned ON is in progress based on the focus detection pixel flag of the additional information (step S5).

Figure 20:
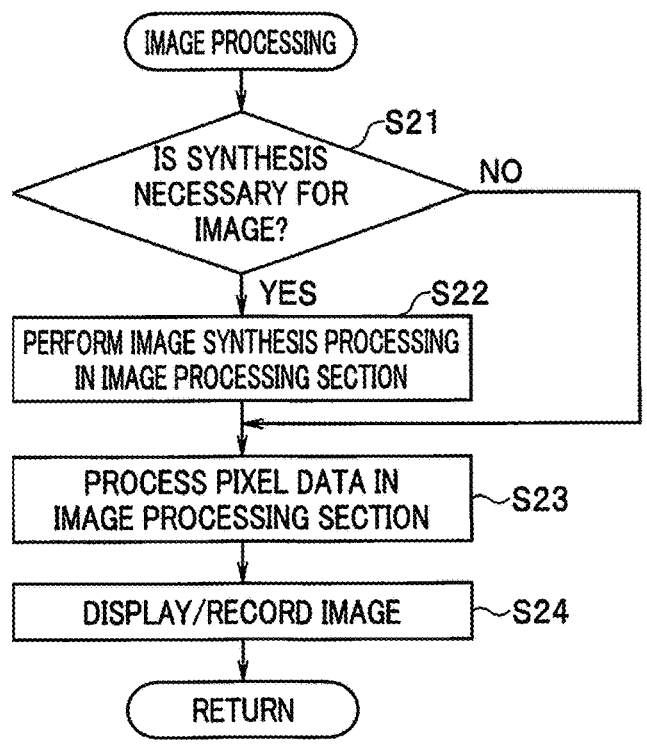
FIG. 20 is a flowchart illustrating contents of the image process in step S6 in FIG. 19 according to Embodiment 1 of the present invention.
Figure 21:
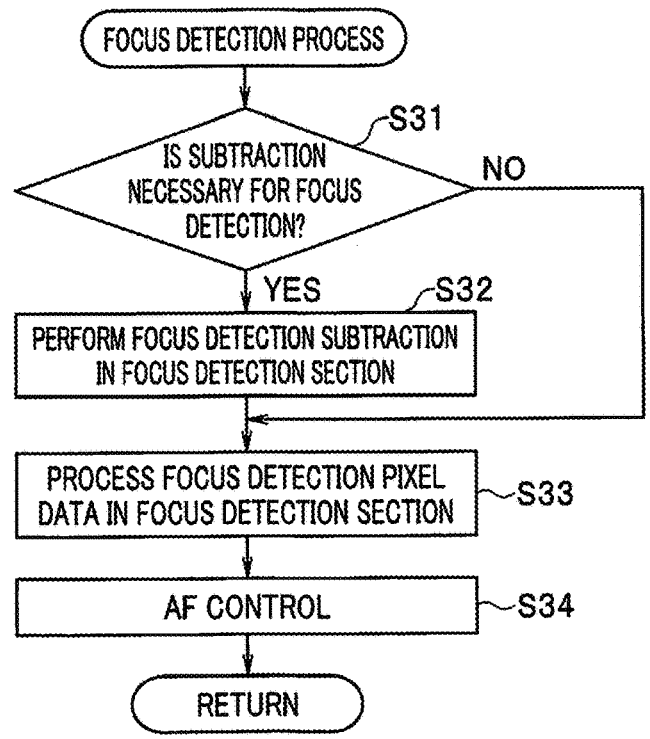
FIG. 21 is a flowchart illustrating contents of the focus detection process in step S7 in FIG. 19 according to Embodiment 1 of the present invention.

Here, when it is determined that the focus detection pixel data period is in progress, the image processing section 5 performs an image process as shown in FIG. 20 which will be described later (step S6) and the focus detection section 7 performs a focus detection process as shown in FIG. 21 which will be described later (step S7) simultaneously with the process in step S6 (that is, as a parallel process).

Furthermore, when it is determined in step S5 that the focus detection pixel data period is not in progress, the system control section 11 turns OFF the focus detection section 7 (at least turns OFF a clock supply and, preferably further turns OFF a power supply) (step S8). The system control section 11 performs only the aforementioned image process in step S6 but does not perform the focus detection process in step S7.

On the other hand, when it is determined in step S4 that the image pixel data period is not in progress, the system control section 11 turns OFF the image processing section 5 (turns OFF at least the clock supply and preferably further turns OFF the power supply) (step S9).

Next, the system control section 11 determines whether or not a focus detection pixel data period during which the focus detection section 7 should be turned ON is in progress based on the focus detection pixel flag of the additional information (step S10).

When it is determined that the focus detection pixel data period is in progress, the system control section 11 performs only the aforementioned focus detection process in step S7 but does not perform the image process in step S6.

Furthermore, when it is determined in step S10 that the focus detection pixel data period is not in progress, the system control section 11 turns OFF the focus detection section 7 (turns OFF at least the clock supply, and preferably further turns OFF the power supply) (step S11).

After performing the processes in step S6 and step S7, or step S6 only, or step S7 only or step S11, the system control section 11 determines whether or not to end the process (step S12). Here, when the system control section 11 determines not to end the process yet, the system control section 11 returns to step S4, performs the aforementioned process and ends the process when the system control section 11 determines to end the process.

FIG. 20 is a flowchart illustrating contents of the image process in step S6 in FIG. 19.

When the image process is started, the system control section 11 determines whether or not an image synthesis process is necessary based on the image synthesis processing flag of the additional information (step S21).

When the system control section 11 determines that the image synthesis process is necessary, the image processing section 5 which is turned ON performs an image synthesis process of synthesizing image pixel data from the inputted focus detection pixel data based on the control of the system control section 11 (step S22).

When the process in step S22 is performed or it is determined in step S21 that the image synthesis process is unnecessary, the image processing section 5 which is ON performs an image process such as so-called developing process (step S23).

After that, an image subjected to image processing is displayed on the display section 8 based on the control of the system control section 11 or recorded in the recording section 6 (step S24), and the flow returns to the process shown in FIG. 19.

FIG. 21 is a flowchart illustrating contents of the focus detection process in step S7 in FIG. 19.

When the focus detection process is started, the system control section 11 determines whether or not the focus detection subtraction process is necessary based on the focus detection subtraction processing flag of the additional information (step S31).

When it is determined that the focus detection subtraction process is necessary, the focus detection section 7 which is ON performs a focus detection subtraction process from the inputted focus detection pixel data under the subtraction reading scheme and reconstructs the necessary focus detection pixel data based on the control of the system control section 11 (step S32).

When the process in S32 is performed or when it is determined in step S31 that the focus detection subtraction process is unnecessary, the focus detection section 7 which is ON performs phase difference detection and calculates lens control parameters (step S33).

After that, the system control section 11 performs AF control on the lens 1 based on lens control parameters (step S34) and returns to the process shown in FIG. 19.

Note that in the above description, the focus detection pixel data is outputted in order of the pixel array in the pixel section 22, but it is also possible to generate focus detection pixel data at different positions relative to the micro lens L as different data sequences and output the focus detection pixel data individually. For example, left focus detection pixel data and right focus detection pixel data may be generated as different pixel data sequences and outputted individually.

Similarly, when pixels are mixed, pixel data with different mixing ratios may be generated and outputted as separate pixel data sequences.

An example of sorting and outputting pixel data with different characteristics according to lanes and an example of dividing the pixel data into the first half and second half parts of the 1 horizontal synchronization period of the same lane have been described, but examples are not limited to these. The pixel data may be sorted and outputted according to different frames (or fields).

Furthermore, in the above description, although the focus detection pixel data outputted from the image pickup device 3 is assumed to be pixel data for phase difference detection, the focus detection pixel data is not limited to the phase difference detection pixel data, but the focus detection pixel data may be converted to AF calculation information or depth data (distance information) or the like in the image pickup device 3.

According to such Embodiment 1, pixel data sequences with the same characteristic are generated and additional information indicating the characteristics is added to the pixel data sequences, and it is therefore possible to know in advance whether or not valid pixel data is inputted to the post-stage data processing section, turn OFF the data processing section to which valid pixel data is not inputted and thereby achieve low power consumption. In this way, it is possible to process pixel data with different characteristics with low power consumption.

When it is determined, based on the additional information, that valid pixel data is not inputted, it is possible to achieve low power consumption by at least stopping a clock supply to the data processing section. At this time, it is possible to achieve much lower power consumption by stopping a power supply to the data processing section.

Furthermore, since information indicating an aspect in which pixel data is pixel-synthesized from focus detection pixel data of a plurality of pixels corresponding to one micro lens L is included in the additional information, it is possible to achieve appropriate low power consumption by changing the process of the data processing section in accordance with the aspect of pixel synthesis.

Since the image pixel flag is included in the additional information and a clock supply to the image processing section 5 is at least stopped when the image pixel flag is OFF, it is possible to appropriately save power of the image processing section 5 when image pixel data is not inputted.

At this time, by further including the image synthesis processing flag in the additional information, it is possible to appropriately control whether or not to cause the image processing section 5 to perform a process of synthesizing image pixel data from the focus detection pixel data.

Since the focus detection pixel flag is included in the additional information and a clock supply to the focus detection section 7 is at least stopped when the focus detection pixel flag is OFF, it is possible to appropriately save power of the focus detection section 7 when the focus detection pixel data is not inputted.

At this time, by further including the focus detection subtraction processing flag in the additional information, it is possible to appropriately control whether or not to cause the focus detection section 7 to reconstruct the focus detection pixel data through the focus detection subtraction process according to the subtraction reading scheme.

Furthermore, since information indicating that the pixel data sequence is an invalid pixel data sequence is included in the additional information and at least both the clock supply to the image processing section 5 and the clock supply to the focus detection section 7 are stopped when the information indicating that the pixel data sequence is an invalid pixel data sequence is included in the additional information, it is possible to appropriately save power to the image processing section 5 and the focus detection section 7 when valid pixel data is not inputted.

By adding the additional information to a part of the pixel data sequence, it is possible to achieve power saving for a period during which the pixel data sequence is inputted after detecting additional information. At this time, by adding the additional information to the head of the pixel data sequence, it is possible to achieve power saving for the entire period during which the pixel data sequence is inputted, and thereby achieve further power saving.

Note that the aforementioned processes of the respective sections may be performed by one or more processors configured as hardware.

Although an image pickup device and an image pickup apparatus provided with the image pickup device have been mainly described so far, the present invention may be an image pickup method for executing processes of an image pickup device or processes similar to the processes of the image pickup device or an image pickup program for causing a computer to execute processes of an image pickup device or processes similar to the processes of the image pickup device or a computer-readable, non-transitory recording medium configured to record the image pickup program.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup device comprising a plurality of pixels, the plurality of pixels being configured to photoelectrically convert incident light and generate a plurality of pieces of pixel data, the image pickup device comprising:
   a plurality of micro lenses configured such that the incident light passing through each of the plurality of micro lenses arrives at a predetermined plural number of pixels;
   an in-device processing hardware processor configured to generate one pixel data by calculating from the plurality of pieces of pixel data within a predetermined plural number of pieces of pixel data generated from the predetermined plural number of pixels corresponding to one micro lens;
   a pixel data sequence generation hardware processor configured to array the plurality of pieces of pixel data according to a characteristic of the pixel data and generate a pixel data sequence composed of the pixel data having a same characteristic; and
   an information adding hardware processor configured to add additional information indicating the characteristic of the pixel data sequence, the additional information comprising information indicating an aspect of pixel synthesis by the in-device processing hardware processor, to the pixel data sequence, the pixel synthesis being of the plurality of pieces of pixel data generated by a single frame of image pickup, the plurality of pieces of pixel data corresponding to the one micro lens.

2. An image pickup apparatus comprising:
   an image pickup device comprising a plurality of pixels, the plurality of pixels being configured to photoelectrically convert incident light and generate a plurality of pieces of pixel data, the image pickup device including a plurality of micro lenses configured such that the incident light passing through each of the plurality of micro lenses arrives at a predetermined plural number of pixels, an in-device processing hardware processor configured to generate one pixel data by calculating from the plurality of pieces of pixel data within a predetermined plural number of pieces of pixel data generated from the predetermined plural number of pixels corresponding to one micro lens, a pixel data sequence generation hardware processor configured to array the plurality of pieces of pixel data according to a characteristic of the pixel data and generate a pixel data sequence composed of the pixel data having a same characteristic, and an information adding hardware processor configured to add additional information indicating the characteristic of the pixel data sequence, the additional information comprising information indicating an aspect of pixel synthesis by the in-device processing hardware processor, to the pixel data sequence;

a data processing hardware processor configured to receive the pixel data outputted from the image pickup device as required and process the pixel data when the pixel data is inputted; and a control hardware processor configured to determine, based on the additional information, whether or not valid pixel data is inputted to the data processing hardware processor, supply power and a clock to the data processing hardware processor when the control hardware processor determines that the valid pixel data is inputted to the data processing hardware processor, or stop at least a clock supply to the data processing hardware processor when the control hardware processor determines that the valid pixel data is not inputted to the data processing hardware processor.

3. The image pickup apparatus according to claim 2, wherein the control hardware processor further performs control so as to stop a power supply to the data processing hardware processor when the control hardware processor determines that the valid pixel data is not inputted to the data processing hardware processor.

4. The image pickup apparatus according to claim 2, wherein the in-device processing hardware processor is configured to pixel-synthesize one piece of pixel data from the plurality of pieces of the pixel data of the predetermined plural number of pieces of pixel data respectively generated from the predetermined plural number of pixels corresponding to each of the plurality of micro lenses, and the control hardware processor performs control so as to change a process by the data processing hardware processor based on the information indicating the aspect of the pixel synthesis included in the additional information.

5. The image pickup apparatus according to claim 4, wherein the data processing hardware processor comprises an image processing hardware processor configured to apply image processing to the pixel data and generate an image, the additional information comprises an image pixel flag, and the control hardware processor determines, when the image pixel flag is ON, that the valid pixel data is inputted to the image processing hardware processor, performs control so as to supply power and a clock to the image processing hardware processor and cause the image processing hardware processor to perform image processing, or performs control so as to stop at least a clock supply to the image processing hardware processor when the image pixel flag is OFF.

6. The image pickup apparatus according to claim 5, wherein the additional information further comprises an image synthesis processing flag, and the control hardware processor causes, when the image pixel flag is ON and further the image synthesis processing flag is ON, the image processing hardware processor to perform a process of synthesizing image pixel data from focus detection pixel data obtained from pixels at different positions relative to each of the plurality of micro lenses.

7. The image pickup apparatus according to claim 4, wherein the data processing hardware processor comprises a focus detection hardware processor configured to perform focus detection based on focus detection pixel data obtained from pixels at different positions relative to each of the plurality of micro lenses, the additional information comprises a focus detection pixel flag, and the control hardware processor determines, when the focus detection pixel flag is ON, that the valid pixel data is inputted to the focus detection hardware processor, performs control so as to supply power and a clock to the focus detection hardware processor and cause the focus detection hardware processor to perform focus detection, or performs control so as to stop at least a clock supply to the focus detection hardware processor when the focus detection pixel flag is OFF.

8. The image pickup apparatus according to claim 7, wherein the additional information further comprises a focus detection subtraction processing flag, and the control hardware processor causes, when the focus detection pixel flag is ON and further the focus detection subtraction processing flag is ON, the focus detection hardware processor to reconstruct the focus detection pixel data through a focus detection subtraction process according to a subtraction reading scheme.

9. The image pickup apparatus according to claim 4, wherein the data processing hardware processor comprises an image processing hardware processor configured to perform image processing on the pixel data and generate an image and a focus detection hardware processor configured to perform focus detection based on focus detection pixel data obtained from pixels at different positions relative to each of the plurality of micro lenses, the additional information comprises information indicating that the pixel data sequence is an invalid pixel data sequence, and the control hardware processor performs control, when the additional information includes information indicating that the pixel data sequence is an invalid pixel data sequence, so as to stop at least both a clock supply to the image processing hardware processor and a clock supply to the focus detection hardware processor.

10. The image pickup apparatus according to claim 2, wherein the information adding hardware processor adds the additional information to a part of the pixel data sequence.

11. The image pickup apparatus according to claim 10, wherein the information adding hardware processor adds the additional information to a head of the pixel data sequence.

12. A computer-readable non-transitory recording medium configured to record an image pickup program for causing a computer to execute:
- an image pickup step of photoelectrically converting incident light and generating a plurality of pieces of pixel data by a plurality of pixels;
- a pixel data sequence generation step of arraying the plurality of pieces of pixel data according to a characteristic of the pixel data and generating a pixel data sequence composed of the pixel data having a same characteristic,
- an information adding step of adding additional information indicating the characteristic of the pixel data sequence to the pixel data sequence;
- a data processing step of inputting the pixel data outputted from an image pickup device to a data processing hardware processor as required and processing the pixel data by the data processing hardware processor when the pixel data is inputted; and
- a control step of performing control so as to determine, based on the additional information, whether or not valid pixel data is inputted to the data processing hardware processor, supply power and a clock to the data processing hardware processor when determining that the valid pixel data is inputted to the data processing hardware processor, or stop at least a clock supply to the data processing hardware processor when determining that the valid pixel data is not inputted to the data processing hardware processor.

13. The recording medium according to claim 12, wherein the control step is a step of performing control, when determining that the valid pixel data is not inputted to the data processing hardware processor, so as to further stop a power supply to the data processing hardware processor.

14. The recording medium according to claim 12, wherein
- the additional information comprises information indicating an aspect of pixel synthesis by the image pickup device, the image pickup device comprising a plurality of micro lenses configured such that incident light passing through each of the plurality of micro lenses arrives at a predetermined plural number of pixels and an in-device processing hardware processor configured to pixel-synthesize one piece of pixel data from the plurality of pieces of pixel data of the predetermined plural number of pieces of pixel data respectively generated from the predetermined plural number of pixels corresponding to each of the plurality of micro lenses, and
- the control step is a step of performing control so as to change a process by the data processing hardware processor based on the information indicating the aspect of the pixel synthesis included in the additional information.

15. The recording medium according to claim 14, wherein
- the additional information comprises an image pixel flag, and
- the control step determines, when the image pixel flag is ON, that the valid pixel data is inputted to an image processing hardware processor included in the data processing hardware processor and configured to apply image processing to the pixel data and generate an image, supplies power and a clock to the image processing hardware processor and causes the image processing hardware processor to perform image processing, and performs control, when the image pixel flag is OFF, so as to stop at least a clock supply to the image processing hardware processor.

16. The recording medium according to claim 14, wherein
- the additional information further comprises a focus detection pixel flag, and
- the control step determines, when the focus detection pixel flag is ON, that the valid pixel data is inputted to a focus detection hardware processor included in the data processing hardware processor and configured to perform focus detection based on focus detection pixel data obtained from pixels at different positions relative to each of the plurality of micro lenses, performs control so as to supply power and a clock to the focus detection hardware processor, causes the focus detection hardware processor to perform focus detection, and performs control, when the focus detection pixel flag is OFF, so as to stop at least a clock supply to the focus detection hardware processor.

17. An image pickup method comprising:
- an image pickup step of photoelectrically converting incident light and generating a plurality of pieces of pixel data by a plurality of pixels;
- a pixel data sequence generation step of arraying the plurality of pieces of pixel data according to a characteristic of the pixel data and generating a pixel data sequence composed of the pixel data having a same characteristic;
- an information adding step of adding additional information indicating the characteristic of the pixel data sequence to the pixel data sequence;
- a data processing step of inputting the pixel data outputted from an image pickup device to a data processing hardware processor as required and processing the pixel data by the data processing hardware processor when the pixel data is inputted; and
- a control step of performing control by determining, based on the additional information, whether or not valid pixel data is inputted to the data processing hardware processor so as to supply power and a clock to the data processing hardware processor when determining that the valid pixel data is inputted to the data processing hardware processor, or stop at least a clock supply to the data processing hardware processor when determining that the valid pixel data is not inputted to the data processing hardware processor.

18. The image pickup method according to claim 17, wherein the control step is a step of performing control so as to further stop a power supply to the data processing hardware processor when determining that the valid pixel data is not inputted to the data processing hardware processor.

19. The image pickup method according to claim 17, wherein in the image pickup device comprising a plurality of micro lenses configured such that incident light passing through each of the plurality of micro lenses arrives at a predetermined plural number of pixels and an in-device processing hardware processor configured to pixel-synthesize one piece of pixel data from the plurality of pieces of pixel data of the predetermined plural number of pieces of pixel data respectively generated from the predetermined plural number of pixels corresponding to each of the plurality of micro lenses,
- the additional information comprises information indicating an aspect of pixel synthesis by the in-device processing hardware processor, and the control step is a step of performing control so as to change a process by the data processing hardware processor based on the information indicating the aspect of the pixel synthesis included in the additional information.

20. The image pickup method according to claim 19, wherein the additional information comprises an image pixel flag, and the control step is a step of determining, when the image pixel flag is ON, that the valid pixel data is inputted to an image processing hardware processor included in the data processing hardware processor and configured to apply image processing to the pixel data and generate an image and performing control so as to supply power and a clock to the image processing hardware processor and cause the image processing hardware processor to perform image processing, and stop at least a clock supply to the image processing hardware processor when the image pixel flag is OFF.

* * * * *